(12) United States Patent
Hayakawa et al.

(10) Patent No.: US 11,772,634 B2
(45) Date of Patent: Oct. 3, 2023

(54) PARKING CONTROL METHOD AND PARKING CONTROL DEVICE

(71) Applicant: Nissan Motor Co., Ltd., Yokohama (JP)

(72) Inventors: Yasuhisa Hayakawa, Kanagawa (JP); Daisuke Tanaka, Kanagawa (JP); Yasuhiro Sakurai, Kanagawa (JP); Yasuhiro Suzuki, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 119 days.

(21) Appl. No.: 16/756,690

(22) PCT Filed: Oct. 27, 2017

(86) PCT No.: PCT/JP2017/038942
§ 371 (c)(1),
(2) Date: Apr. 16, 2020

(87) PCT Pub. No.: WO2019/082388
PCT Pub. Date: May 2, 2019

(65) Prior Publication Data
US 2021/0253090 A1  Aug. 19, 2021

(51) Int. Cl.
*B60W 30/06* (2006.01)
*B60W 50/08* (2020.01)

(52) U.S. Cl.
CPC ............ *B60W 30/06* (2013.01); *B60W 50/08* (2013.01); *B60W 2554/4041* (2020.02); *B60W 2554/80* (2020.02)

(58) Field of Classification Search
None
See application file for complete search history.

(56) References Cited

U.S. PATENT DOCUMENTS

| 9,145,067 B1 * | 9/2015 | Dahlen | G01S 1/00 |
| 9,588,516 B1 * | 3/2017 | Gurel | G08G 5/0069 |
| 9,594,376 B2 * | 3/2017 | Larsson | G05D 1/021 |

(Continued)

FOREIGN PATENT DOCUMENTS

| DE | 102014205122 A1 | 9/2015 |
| JP | 2006-234418 A | 9/2006 |
| JP | 2006-306233 A | 11/2006 |

(Continued)

*Primary Examiner* — Christian Chace
*Assistant Examiner* — Scott R Jagolinzer
(74) *Attorney, Agent, or Firm* — Young Basile Hanlon & MacFarlane, P.C.

(57) ABSTRACT

A parking control method executes a control instruction for moving a vehicle along a parking route. The parking route is calculated based on an operation command acquired from an operator located outside the vehicle. The parking control method includes detecting a relative altitude between a first height position of the operator and a second height position of the vehicle and when determining that the relative altitude is not less than a first predetermined value, changing a first speed to a second speed lower than the first speed. The first speed is preliminarily set in the control instruction. The parking control method further includes moving the vehicle in accordance with the control instruction changed.

7 Claims, 22 Drawing Sheets

(56) References Cited

U.S. PATENT DOCUMENTS

2018/0148094 A1* 5/2018 Mukaiyama ......... G05D 1/0033

FOREIGN PATENT DOCUMENTS

| JP | 2007-265288 A | 10/2007 |
| JP | 2007-272835 A | 10/2007 |
| JP | 2013-045290 A | 3/2013 |
| JP | 2014-065392 A | 4/2014 |
| JP | 2015-089733 A | 5/2015 |
| JP | 2016-074285 A | 5/2016 |

* cited by examiner

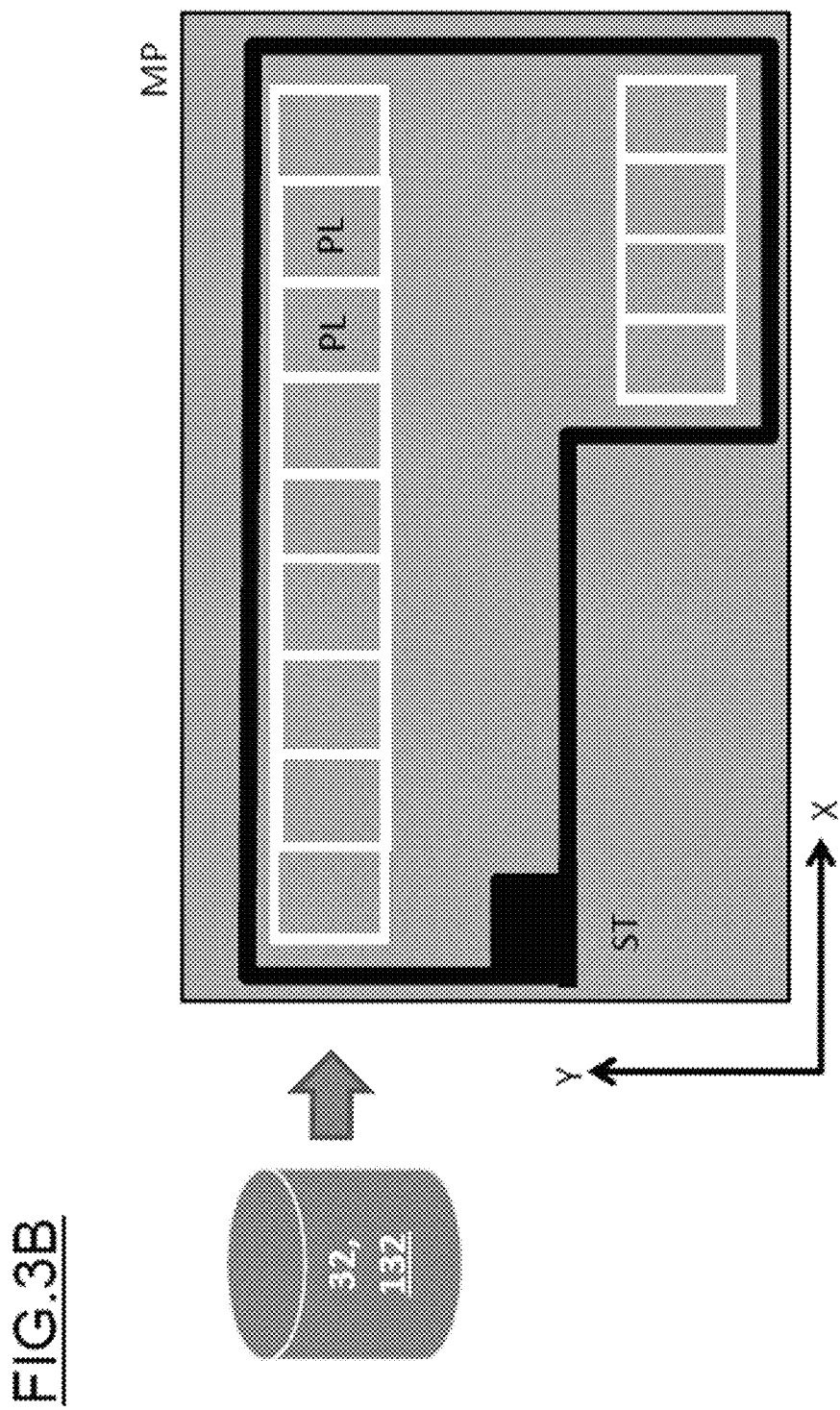

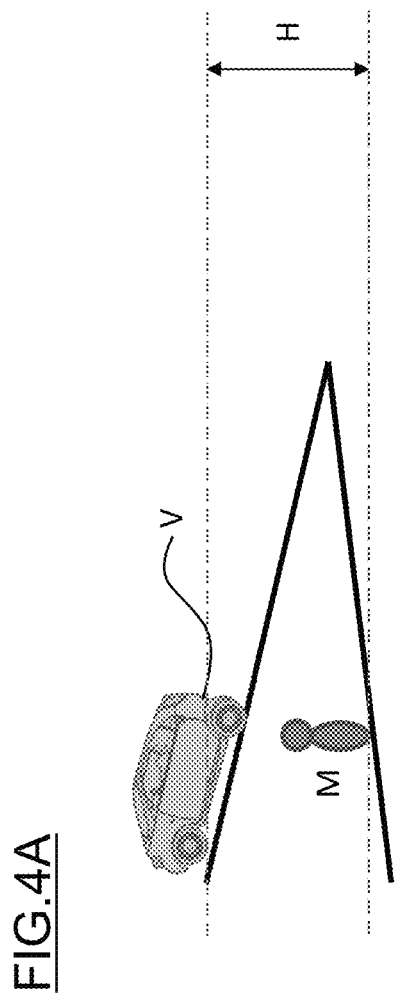

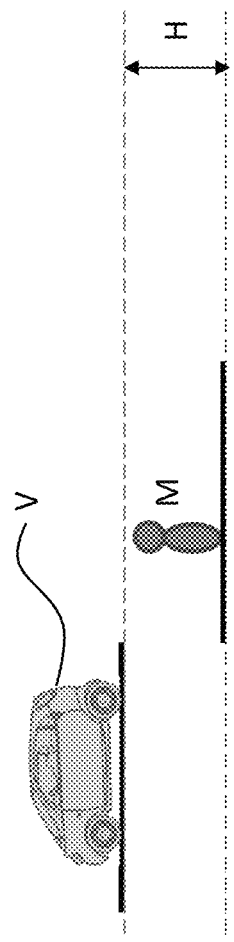

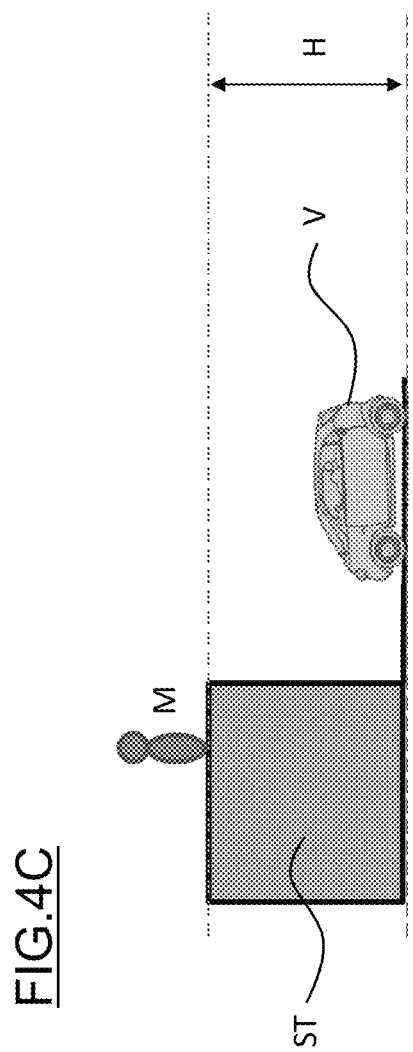

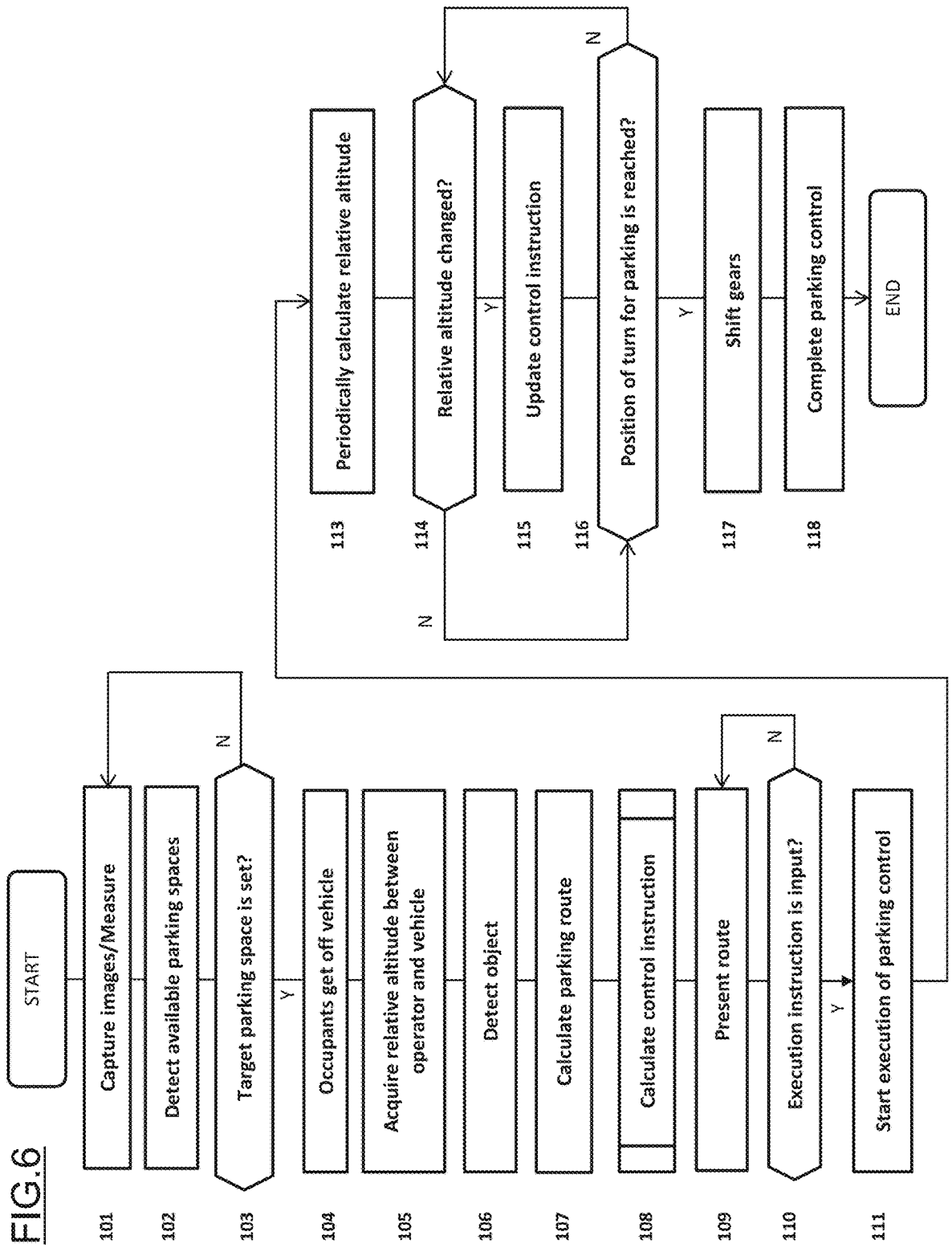

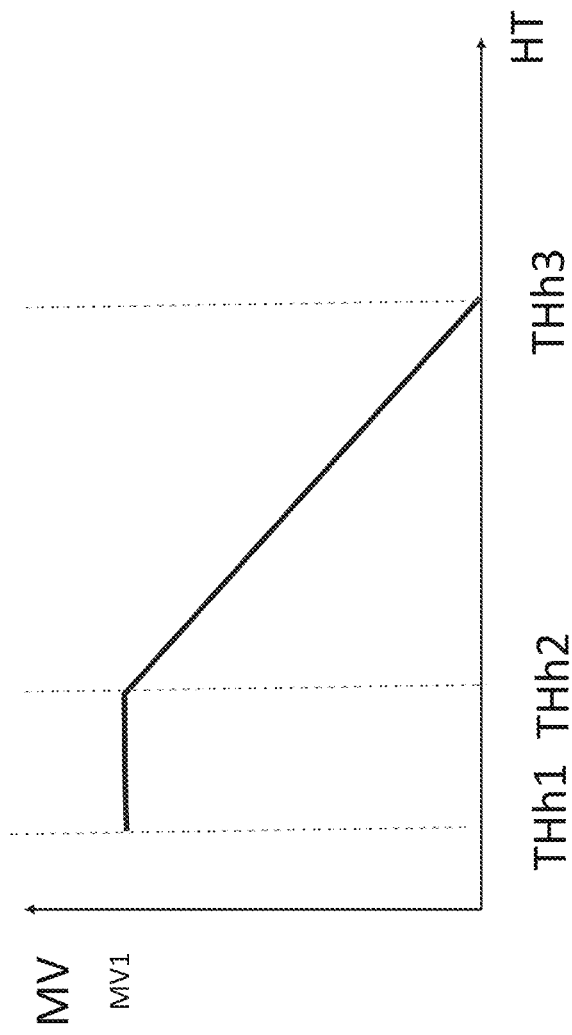

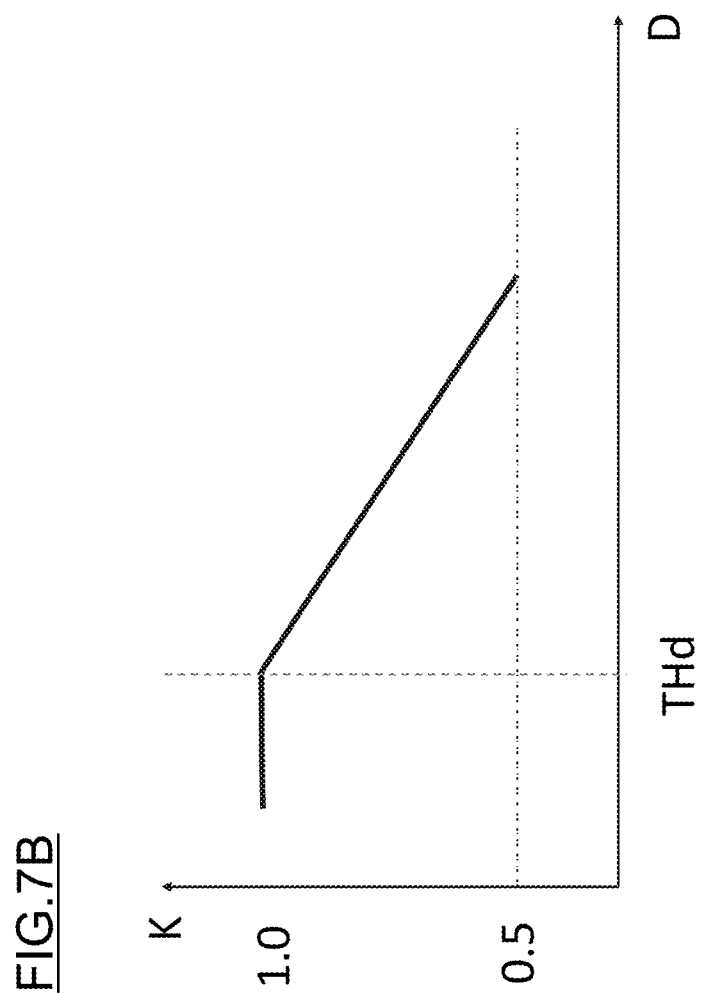

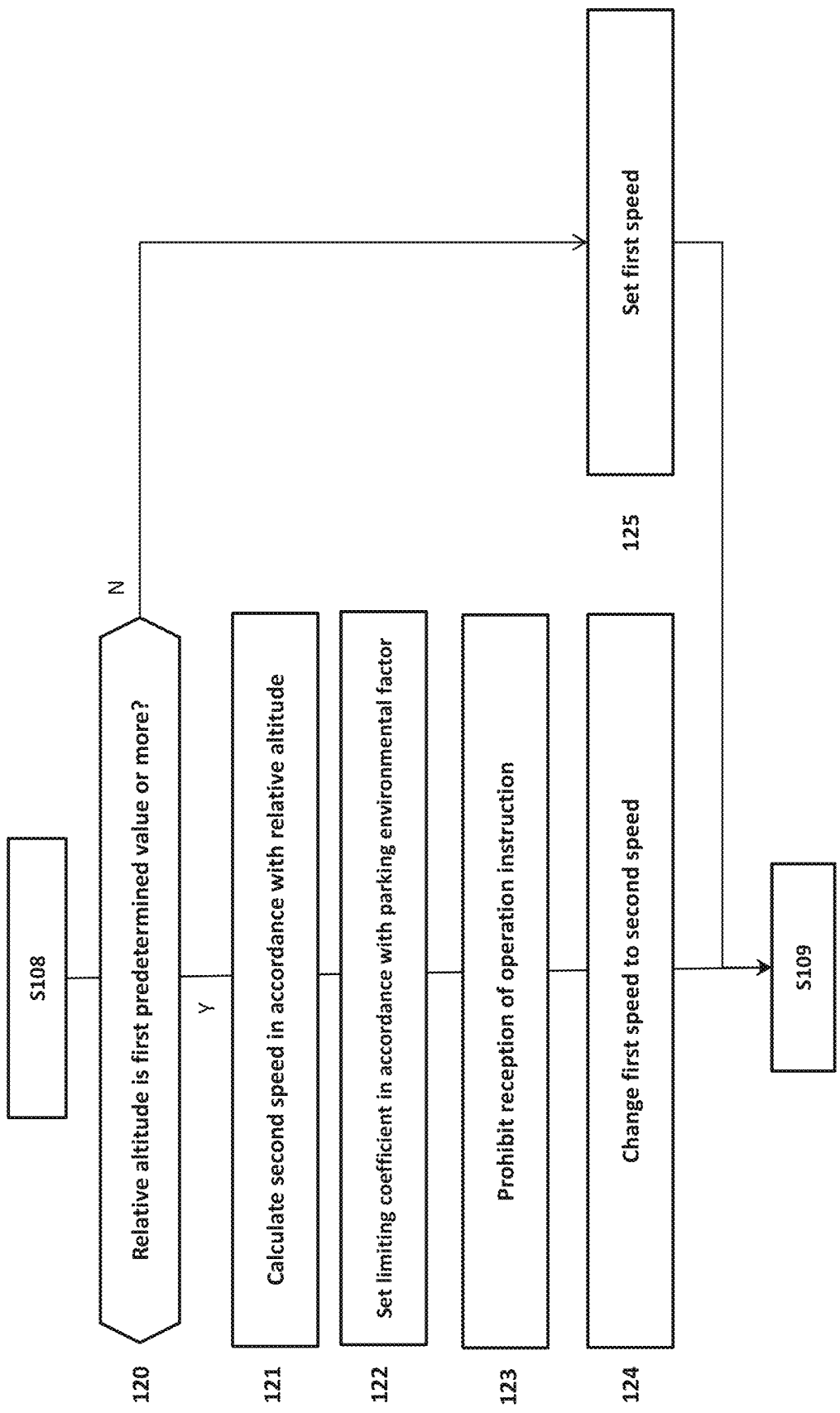

PARKING CONTROL METHOD AND PARKING CONTROL DEVICE

TECHNICAL FIELD

The present invention relates to a parking control method and a parking control apparatus.

BACKGROUND

A technique is known in which a vehicle is moved at a low vehicle speed when a parking position of the vehicle is adjusted (JP2006-306233A).

SUMMARY

In the above prior art, however, the vehicle is moved at a speed that is unexceptionally reduced regardless of the height difference between the operator and the vehicle, and a problem is therefore that the operability in remote parking cannot be ensured when there is a height difference.

A problem to be solved by the present invention is to execute the remote parking control with high operability even when there is a height difference between the operator and the vehicle.

The present invention solves the above problem by changing a first speed to a second speed lower than the first speed when a relative altitude between the height position of an operator and the height position of a vehicle is not less than a first predetermined value. The first speed is preliminarily set in a control instruction for moving the vehicle along a parking route.

According to the present invention, the remote parking control can be executed with high operability even when there is a height difference between the operator and the vehicle.

BRIEF DESCRIPTION OF THE DRAWINGS

FIG. 3B is a diagram for describing a second detection scheme for an obstacle;

FIG. 4A is a first diagram for describing the relationship between a vehicle and an operator;

FIG. 4B is a second diagram for describing the relationship between a vehicle and an operator;

FIG. 4C is a third diagram for describing the relationship between a vehicle and an operator;

FIG. 6 is a flowchart illustrating an example of a control procedure executed by the parking control system according to one or more embodiments of the present invention;

FIG. 7A is a diagram illustrating an example of the relationship between a relative altitude HT and a second speed MV;

FIG. 7B is a diagram illustrating an example of the relationship between a distance D and a coefficient;

FIG. 9 is a flowchart illustrating an example of a process of setting a control instruction.

DETAILED DESCRIPTION

Hereinafter, one or more embodiments of the present invention will be described with reference to the drawings.

In the embodiments, the present invention will be described by exemplifying a case in which the parking control apparatus according to the present invention is applied to a parking control system. The parking control apparatus may also be applied to a portable operation terminal (equipment such as a smartphone or a PDA: Personal Digital Assistant) capable of exchanging information with an onboard apparatus. The parking control method according to the present invention can be used in the parking control apparatus, which will be described below.

Figure 1:
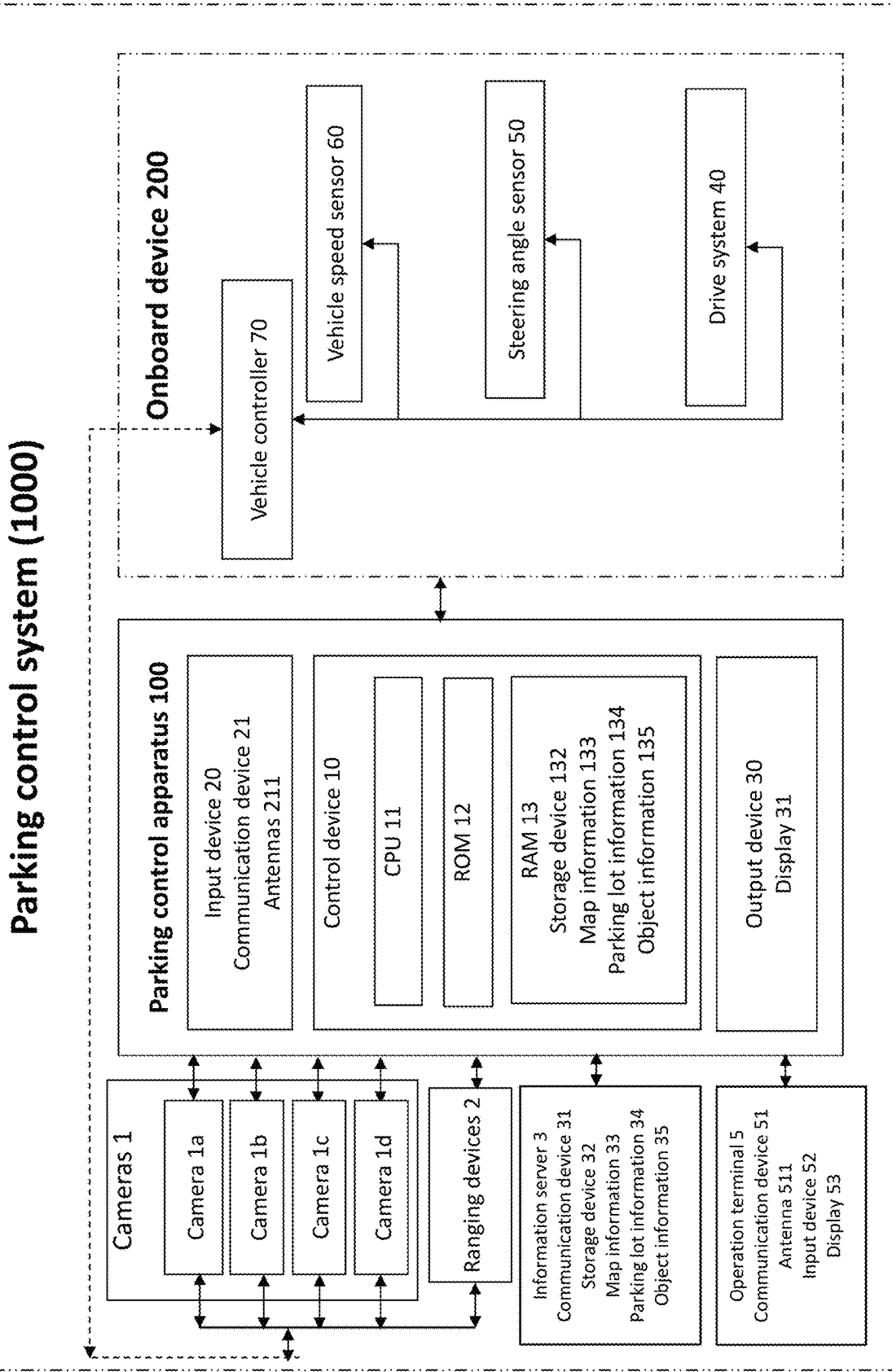
FIG. 1 is a block diagram illustrating an example of a parking control system according to one or more embodiments of the present invention.

FIG. 1 is a block diagram of a parking control system 1000 including a parking control apparatus 100 according to one or more embodiments of the present invention. The parking control system 1000 according to one or more embodiments of the present invention includes cameras 1a to 1d, ranging devices 2, an information server 3, an operation terminal 5, the parking control apparatus 100, a vehicle controller 70, a drive system 40, a steering angle sensor 50, and a vehicle speed sensor 60. The parking control apparatus 100 according to one or more embodiments of the present invention controls the operation of moving (parking) a vehicle into a parking space on the basis of an operation command that is input from the operation terminal 5.

The operation terminal 5 is a portable computer that can be brought out to outside of the vehicle and has an input function and a communication function. The operation terminal 5 receives the input of an operation command made by an operator M for controlling the driving (operation) of the vehicle for parking. The driving includes operations for parking (operations for entering a parking space and exiting the parking space). The operator M inputs instructions via the operation terminal 5. The instructions include an operation command for parking the vehicle as the target of control. The operation command includes information on the execution/stop of parking control, selection/change of a target parking space, and selection/change of a parking route and other information necessary for parking. The operator M can also make the parking control apparatus 100 recognize the instructions including the operation command without using the operation terminal 5, such as by a gesture made by the operator M (i.e., the operator M can input such instructions to the parking control apparatus 100 without using the operation terminal 5, such as by a gesture).

The operation terminal 5 includes a communication device and is capable of exchanging information with the parking control apparatus 100 and the information server 3. The operation terminal 5 transmits the operation command, which is input outside the vehicle, to the parking control apparatus 100 via a communication network and inputs the operation command to the parking control apparatus 100. The operation terminal 5 communicates with the parking control apparatus 100 using signals including a unique identification code.

The operation terminal 5 includes a display 53. The display 53 presents an input interface and various information items. When the display 53 is a touch panel-type display, it has a function of receiving the operation command.

The operation terminal 5 may be portable equipment, such as a smartphone or a PDA: Personal Digital Assistant, in which applications are installed for receiving an input of the operation command used in the parking control method according to one or more embodiments of the present invention and transmitting the operation command to the parking control apparatus 100.

The information server 3 is an information provision device provided on a network capable of communication. The information server includes a communication device 31 and a storage device 32. The storage device 32 includes readable map information 33, parking lot information 34, and obstacle information 35. The parking control apparatus 100 and the operation terminal 5 can access the storage device 32 of the information server 3 to acquire each information item.

The parking control apparatus 100 according to one or more embodiments of the present invention includes a control device 10, an input device 20, and an output device 30. These components of the parking control apparatus 100 are connected to one another via a controller area network (CAN) or other onboard LAN to mutually exchange information. The input device 20 includes a communication device 21. The communication device 21 receives the operation command transmitted from the external operation terminal 5 and inputs the operation command to the input device 20. The subject who inputs the operation command to the external operation terminal 5 may be a person (a user, a passenger, a driver, or a worker of a parking facility). The input device 20 transmits the received operation command to the control device 10. The output device 30 includes a display 31. The output device 30 notifies the driver of parking control information. The display 31 according to one or more embodiments of the present invention is a touch panel-type display having an input function and an output function. When the display 31 has an input function, it serves as the input device 20. Even when the vehicle is controlled on the basis of the operation command which is input from the operation terminal 5, an occupant (driver or passenger) can input the operation command, such as a command for emergency stop, via the input device 20.

The control device 10 of the parking control apparatus 100 according to one or more embodiments of the present invention is a computer for parking control including a ROM 12 that stores a parking control program, a CPU 11 as an operation circuit that executes the program stored in the ROM 12 to serve as the parking control apparatus 100 according to one or more embodiments of the present invention, and a RAM 13 that serves as an accessible storage device.

The parking control program according to one or more embodiments of the present invention includes a program for detecting a relative altitude/height between a first height position of the operator M (a first height of a position where the operator M is located/existed) and a second height position of a vehicle V (a second height of a position where a vehicle V is located/existed) as the target of control; when the relative altitude/height is not less than a first predetermined value, changing a first speed, which is preliminarily set in the control instruction, to a second speed lower than the first speed; and executing the parking control for the vehicle V in accordance with the control instruction changed.

The parking control apparatus 100 according to one or more embodiments of the present invention is a remote control-type apparatus that receives the operation command from outside and controls the movement of the vehicle V to park the vehicle V into a given parking space. The occupant may be located outside the vehicle interior or may also be located inside the vehicle interior.

The parking control apparatus 100 according to one or more embodiments of the present invention may be of an autonomous (automated) control type in which the steering operation and the accelerator/brake operation are performed in an autonomous (automated) manner. The parking control apparatus 100 may also be of a semiautonomous (semiautomated) type in which the steering operation is performed in an autonomous manner while the driver performs the accelerator/brake operation.

In the parking control program according to one or more embodiments of the present invention, the user may arbitrarily select the target parking space, or the parking control apparatus 100 or the parking facility side may automatically set the target parking space.

The control device 10 of the parking control apparatus 100 according to one or more embodiments of the present invention has functions of executing a detection process for the relative altitude/height between the first height position of the operator M and the second height position of the vehicle V, a calculation process for the parking route, a calculating process for the control instruction including the speed, and a parking control process. The control device 10 further has functions of executing an obstacle detection process and calculating the parking route by taking into account the position of an obstacle. Each of the above processes is executed by cooperation of software for implementing the process and the above-described hardware.

Some processes of detecting the position of the operator M will be described with reference to FIGS. 2A to 2D. The control device 10 acquires the position of the operator M. The position of the operator M includes information on the position on the movement plane of the vehicle V (two-dimensional position information) and information on the height position (three-dimensional position information). The position of the operator M may be detected on the basis of the sensor signals from sensors provided in the vehicle V or may also be obtained through detecting the position of the operation terminal 5 carried by the operator M and calculating the position of the operator M on the basis of the position the operation terminal 5. The operation terminal 5 may be provided at a predetermined position or may also be carried by the operator M. When the operation terminal 5 is provided at a predetermined position, the operator M moves to the position at which the operation terminal 5 is provided, and uses the operation terminal 5 at that position. In these cases, the position of the operation terminal 5 can be employed as the position of the operator M.

Figure 2A:
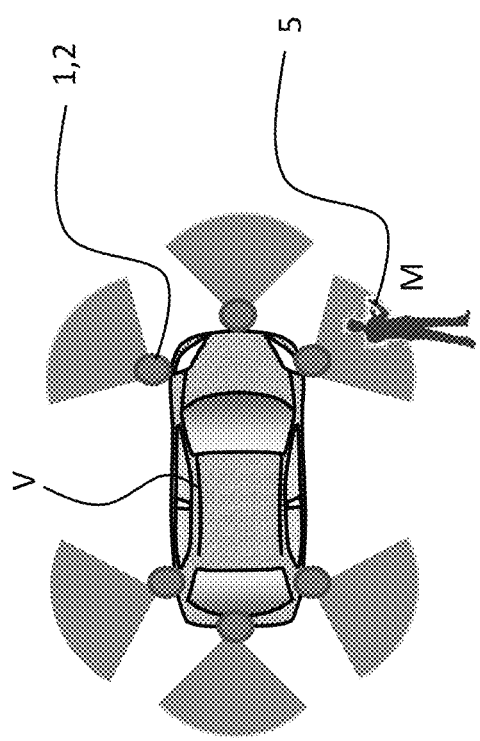
FIG. 2A is a diagram for describing a first detection scheme for the position of an operator.

As illustrated in FIG. 2A, the position of the operator M is detected on the basis of the detection results from the multiple ranging devices 2 provided in the vehicle and/or the images captured by the cameras 1. The position of the operator M can be detected on the basis of the images captured by the cameras 1a to 1d. The ranging devices 2 for use may each be a radar device, such as a millimeter-wave radar device, a laser radar device, or an ultrasonic radar device, or a sonar device. The multiple ranging devices 2 and their detection results can be identified, and the two-dimensional position and/or three-dimensional position of the operator M can therefore be detected on the basis of the detection results. The ranging devices 2 may be provided at the same positions as the cameras 1a to 1d or may also be provided at different positions. The control device 10 can also detect a gesture of the operator M on the basis of the images captured by the cameras 1a to 1d and identify the operation command associated with features of the image of the gesture.

Figure 2B:
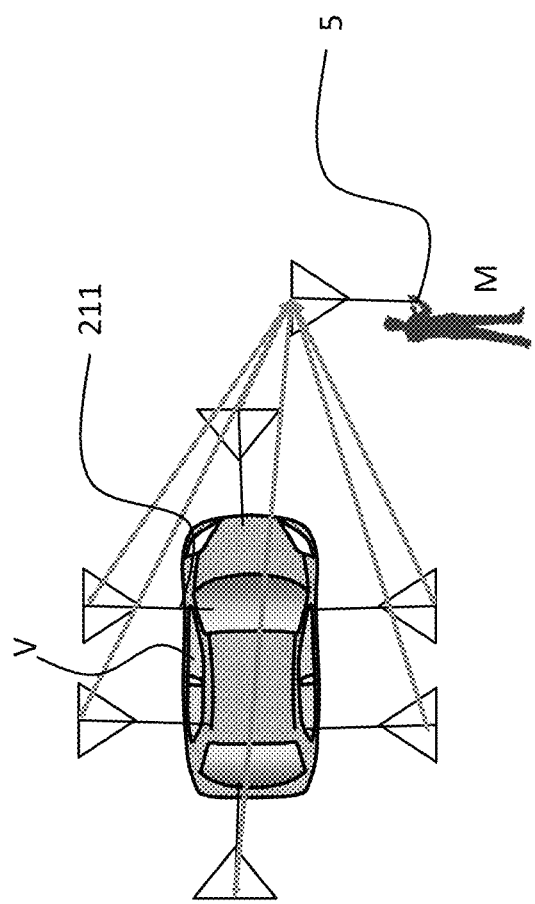
FIG. 2B is a diagram for describing a second detection scheme for the position of an operator.

As illustrated in FIG. 2B, the position of the operation terminal 5 or of the operator M carrying the operation terminal 5 may also be detected on the basis of the communication radio waves between multiple antennas 211 provided at different positions of the vehicle V and the operation terminal 5. When the multiple antennas 211 communicate with an antenna 511 of the one operation terminal 5, the intensity of the received radio wave of each antenna 211 is different. The position of the operation terminal 5 can be calculated on the basis of the intensity difference between the received radio waves of the antennas 211. The two-dimensional position and/or three-dimensional position of the operation terminal 5 or of the operator M can be calculated from the intensity difference between the received radio waves of the antennas 211.

Figure 2C:
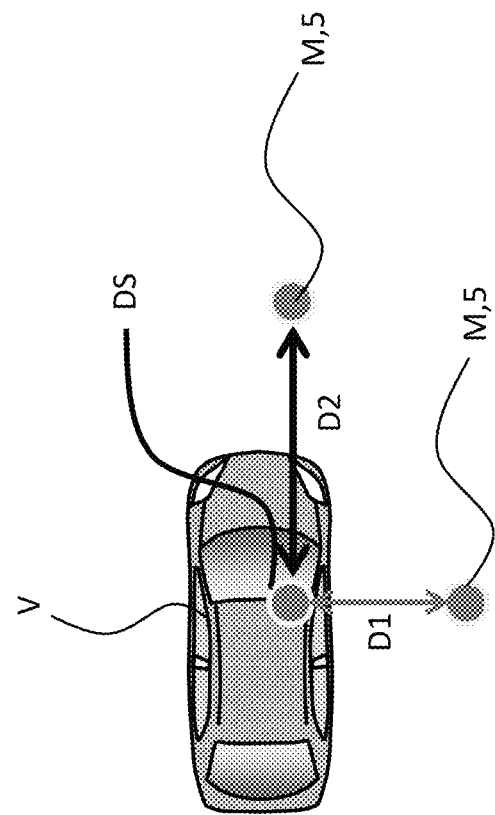
FIG. 2C is a diagram for describing a third detection scheme for the position of an operator.

As illustrated in FIG. 2C, a predetermined position (direction/distance: D1, D2) with respect to the driver seat DS of the vehicle V may be preliminarily designated as the operating position of the operator M or as the position at which the operation terminal 5 is disposed. For example, when the operator M temporarily stops the vehicle V at a designated position and gets off the vehicle V to operate the operation terminal 5 provided at the predetermined position, it is possible to detect the initial position of the operator M with respect to the vehicle V or the initial position of the terminal 5, which is carried by the operator M, with respect to the vehicle V.

Figure 2D:
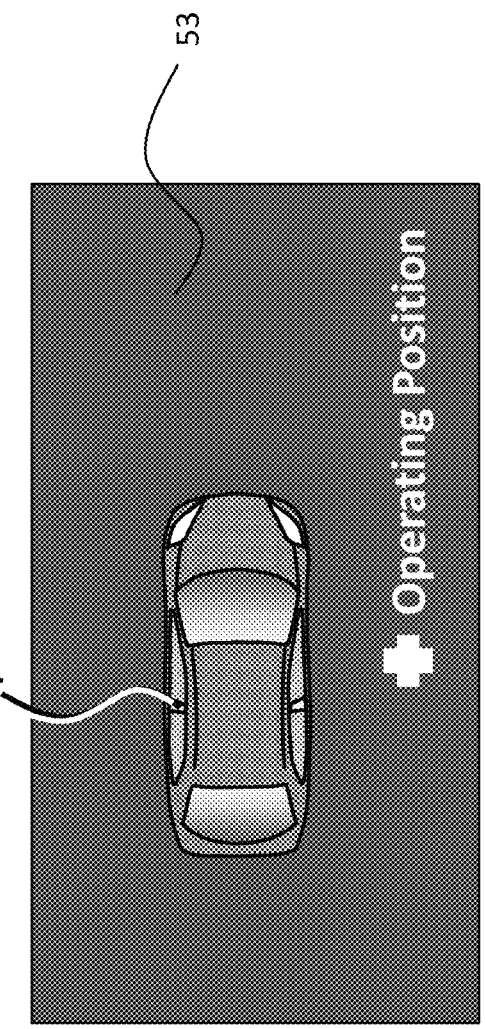
FIG. 2D is a diagram for describing a fourth detection scheme for the position of an operator.

As illustrated in FIG. 2D in a similar manner, image information representing the operating position (a position at which the operator M stands: operation position) with respect to the vehicle V is displayed on the display 53 of the operation terminal 5. This display control may be executed by an application installed on the operation terminal 5 side or may also be executed on the basis of a command from the control device 10.

The position (including the height position) of the vehicle V can be acquired on the basis of the detection value of a position detection device provided in the vehicle V. The position detection device detects the position of a radio wave receiving device (the vehicle V or the operation terminal 5) on the basis of received radio waves from satellites such as those of the global positioning system (GPS). Likewise, the position of the operator M can be acquired on the basis of the detection value of a position detection device provided in the operation terminal 5.

The height information of the operator M and vehicle V may be acquired as a relative difference between the heights, that is, information on a relative altitude/height. The relative altitude/height can be obtained as "the first height position of the operator M minus the second height position of the vehicle" or "the second height position of the vehicle minus the first height position of the operator M." The relative position of the operator M with respect to the vehicle V can be detected on the basis of the received radio waves of the previously described ranging devices 2 equipped in the vehicle V, and the relative altitude/height can therefore be calculated from the height information of the relative position. Additionally or alternatively, the relative position of the operator M with respect to the vehicle V can be detected in a similar manner on the basis of the captured images of the operator M from the cameras 1 equipped in the vehicle V, and the relative altitude/height can therefore be calculated from the height information of the relative position. Additionally or alternatively, the relative position of the operator M with respect to the vehicle V can be detected in a similar manner on the basis of the received radio wave from the operation terminal 5, which is received in a communication device 51 equipped in the vehicle V, and the relative altitude/height can therefore be calculated from the height information of the relative position.

The detection process for an obstacle will be described with reference to FIGS. 3A and 3B. "Obstacles" include structures, such as walls and pillars of a parking facilities, installations around the vehicle, pedestrians, other vehicles, etc.

Figure 3A:
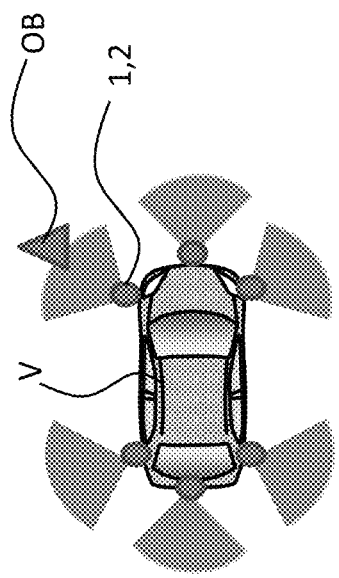
FIG. 3A is a diagram for describing a first detection scheme for an obstacle.

As illustrated in FIG. 3A, an obstacle is detected on the basis of the detection results from the multiple ranging devices 2 provided in the vehicle V and/or the images captured by the cameras 1. The ranging devices 2 detect the presence or absence of an object (OB), the position of the object (OB), the size of the object (OB), and the distance to the object (OB) on the basis of the received signals of the radar devices. Additionally or alternatively, the presence or absence of an object (OB), the position of the object (OB), the size of the object (OB), and the distance to the object (OB) may be detected on the basis of the images captured by the cameras 1a to 1d. The detection of an obstacle may be performed using a movement stereo technique with the images captured by the cameras 1a to 1d. The detection results are used to determine whether or not a parking space is empty (whether or not a vehicle is parked in the parking space).

As illustrated in FIG. 3B, obstacles including structures such as walls and pillars of a parking lot can be detected on the basis of the parking lot information 34 acquired from the storage device 32 of the information server 3. The parking lot information includes the location and identification number of each parking lot and positional information of passages, pillars, walls, storage spaces, etc. in the parking facility. The information server 3 may be managed by staffs of the parking lot.

FIGS. 4A to 4C illustrate examples of the positional relationship between the vehicle V and the operator M. FIG. 4A illustrates an example of the case in which the floors where the operator M and the vehicle V are present are different in a multilevel parking lot. FIG. 4B illustrates an example of the case in which a step exists between the floors where the operator M and the vehicle V are present and the step has a height difference which the operator M cannot get over. FIG. 4C illustrates an example of the case in which the operator M is present on an upper floor (upper side) of a structure ST such as a building and looks down on the vehicle V present on a lower floor (lower side). In the examples illustrated in FIGS. 4A to 4C, the height positions of the vehicle V and operator M are different. The relative altitude H can be obtained on the basis of the height information of the relative position between the vehicle V and the operator M. The operator M in the positional relationships illustrated in these figures has a relative altitude of a predetermined value or more and therefore cannot immediately move to the vicinity of the vehicle to confirm the surroundings of the vehicle.

FIGS. 5A to 5D illustrate situations in which the operator M observes the vehicle V when the height positions of the vehicle V and operator M are different. With reference to these figures, some scenes will be studied in which the operator M who performs the remote control operates the vehicle V to park the vehicle V. In these figures, the vehicle as the target of the parking operation is a vehicle V1. The vehicle V1 and other vehicles V2 and V3 are located on a parking surface PG1 formed of a net-like plate material PG having a plurality of through holes/opening/mesh. The vehicle V1 and the operation terminal 5 can communicate with each other because the plate material PG which is a structure of the parking surface PG1 has a plurality of through holes/opening/mesh. Examples of the plate material PG for use include metal, light metal, and a resin material such as reinforced plastic.

Figure 5A:
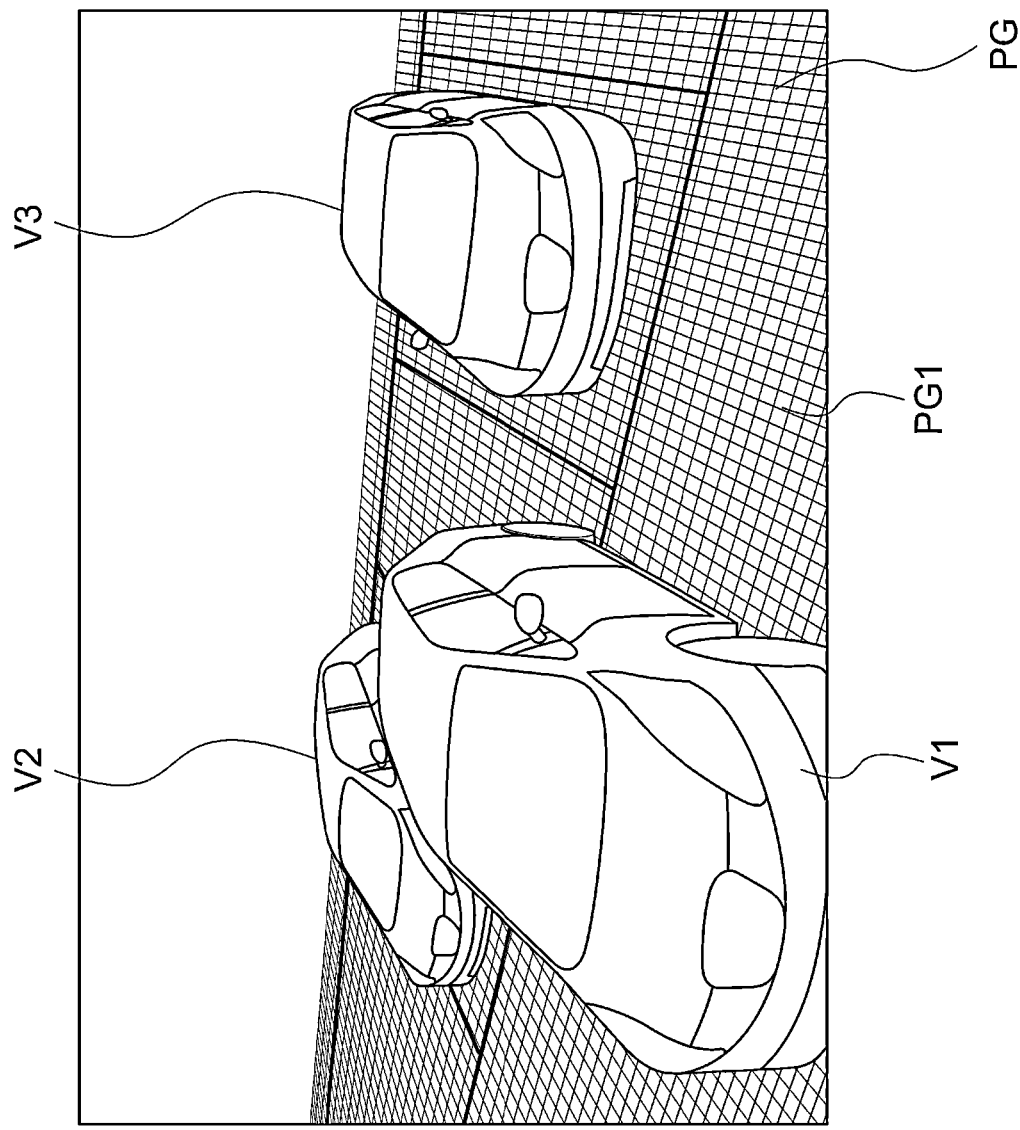
FIG. 5A is a diagram illustrating vehicles viewed from an operator located at a first position.

The other vehicles V2 and V3 are already parked on both sides of the space in which the vehicle V1 is to be parked. In FIGS. 5A to 5D, the relative height between the vehicle V1 and the viewpoint of the operator M viewing the vehicle V1 are different. FIG. 5A is a diagram illustrating the vehicles V1 to V3 observed from the viewpoint of the operator M who is present on the same floor as the parking surface PG1 for the vehicle V1 as typical.

Figure 5B:
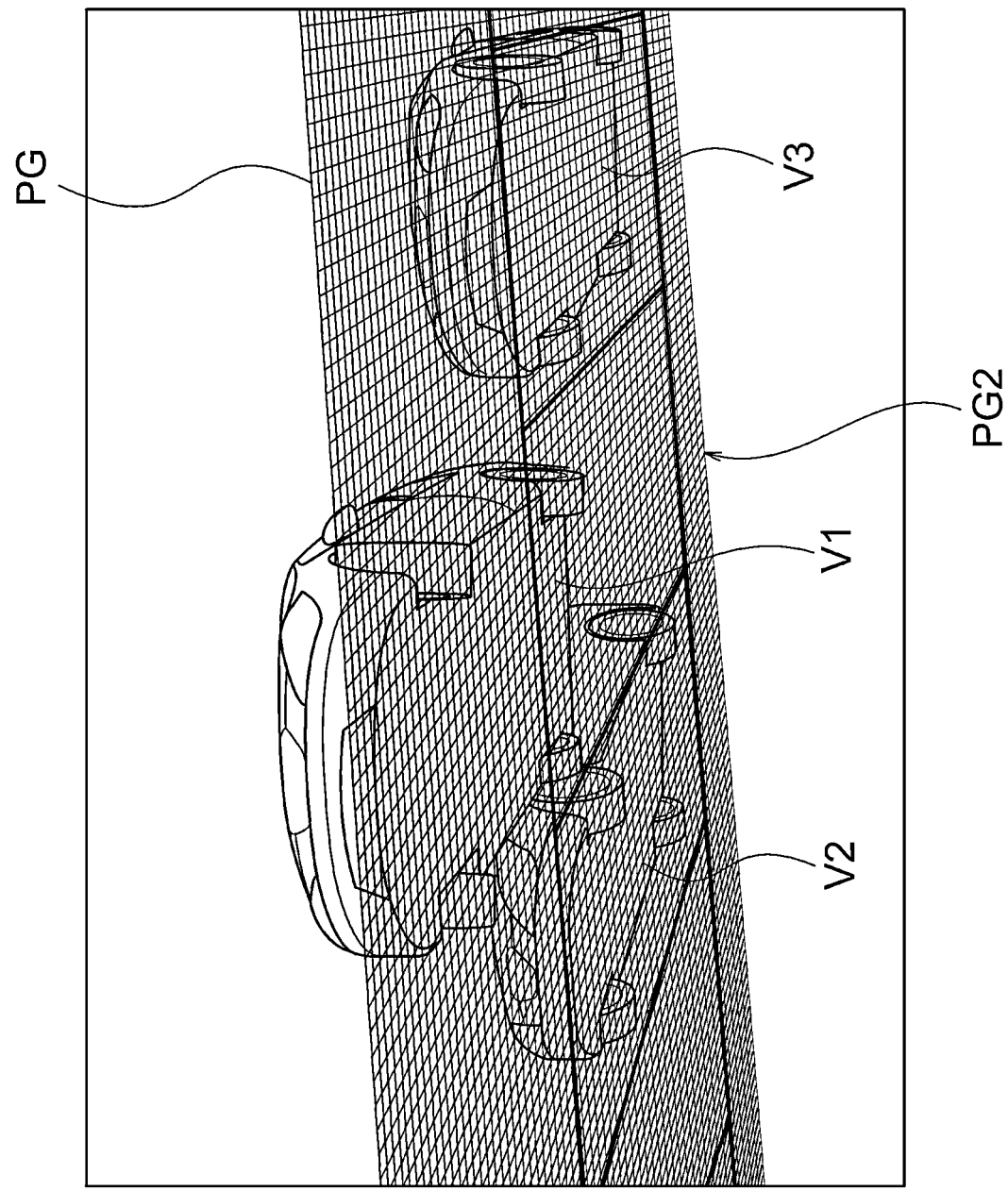
FIG. 5B is a diagram illustrating vehicles viewed from an operator located at a second position.

FIG. 5B is a diagram illustrating the vehicles V1 to V3 observed from the viewpoint of the operator M who is present at a position on a floor lower than the position of the vehicle V1 on the parking surface PG1 when the floors on which the operator M and the vehicle V are present are different in a parking lot having a multi-level structure, for example, as illustrated in FIG. 4A. As illustrated in FIG. 5B, the operator M views the back surfaces (bottom surfaces) of the vehicles V1 to V3 from the back surface PG2 side of the parking surface PG1. The parking surface PG1 is a surface (net-like surface) having a large number of through holes/opening/mesh, and the operator M can therefore observe the vehicles V1 to V3 through the through holes/opening/mesh.

Figure 5C:
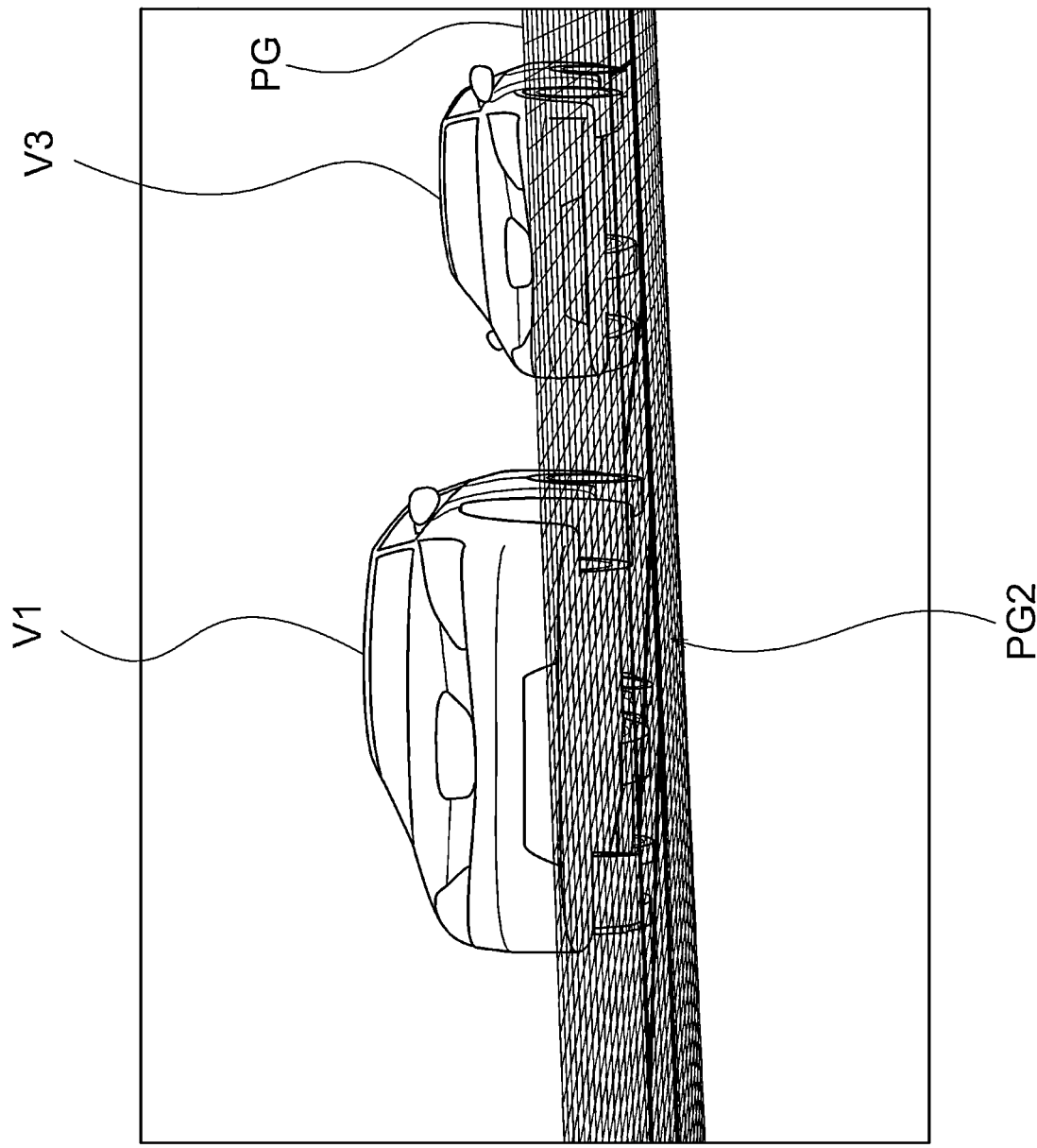
FIG. 5C is a diagram illustrating vehicles viewed from an operator located at a third position.

FIG. 5C is a diagram illustrating the vehicles V1 to V3 observed from the viewpoint of the operator M when a step exists between the floors on which the operator M and the vehicle V are present and the step has a height difference which the operator M cannot get over. As an example, this figure is a diagram illustrating a state in which when floors of a parking lot are connected by a slope, the operator M present on the slope between a second floor mezzanine and a second floor looks up the vehicles V1 to V1 parked on the second floor as an upper floor.

Figure 5D:
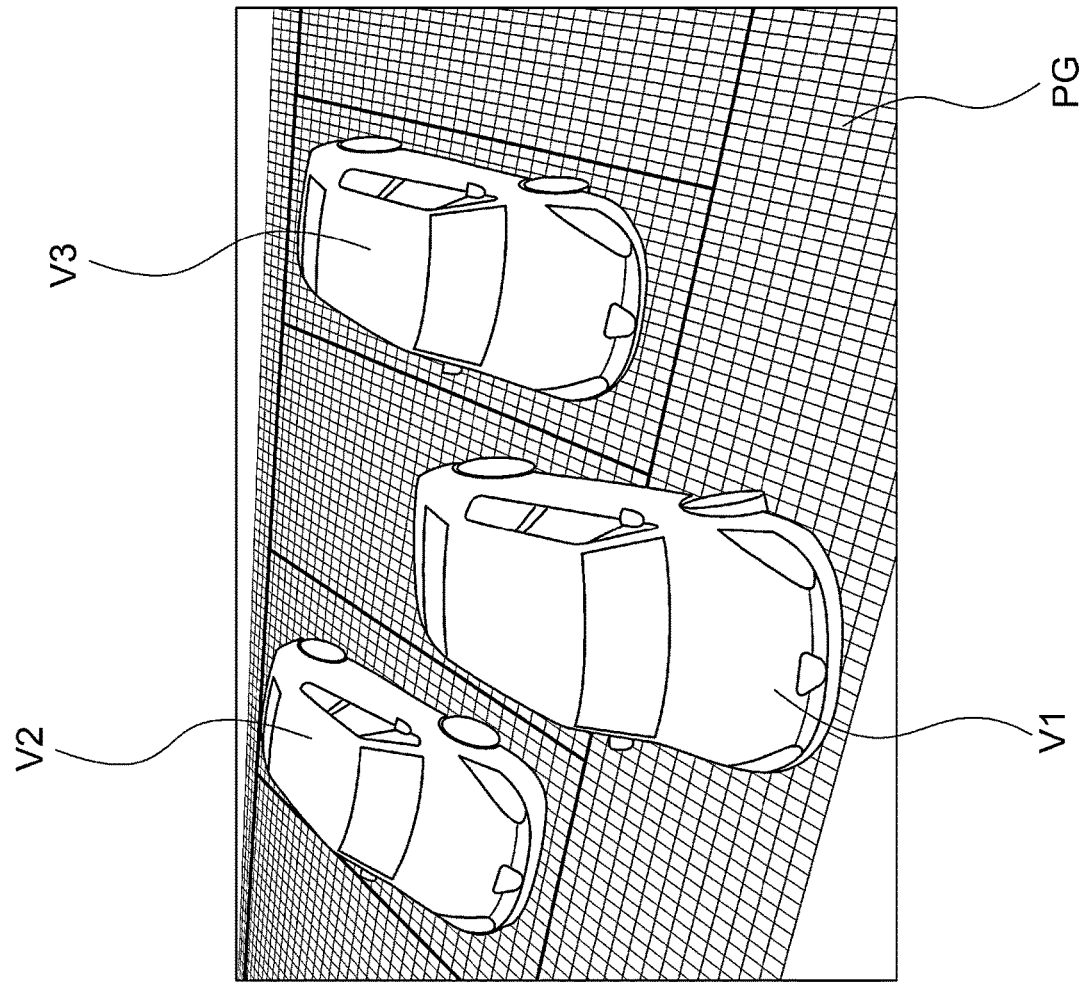
FIG. 5D is a diagram illustrating vehicles viewed from an operator located at a fourth position.

FIG. 5D is a diagram illustrating the vehicles V1 to V3 observed from the viewpoint of the operator M when the operator M is present on the upper floor of the building ST and looks down on the vehicle V located on the lower floor, as illustrated in FIG. 4C.

Thus, the operator M may be present at a position lower than the vehicle V1 as the target of operation. When the relative altitude is large, the operator M cannot immediately approach the vehicle to confirm the surroundings.

As illustrated in FIG. 5A, when viewing the vehicles from the same floor as typical, the operator M can confirm the presence of the vehicle V2 located behind the vehicle V1. However, as illustrated in FIG. 5B, when viewing the vehicles from a lower position on a lower floor, the operator M cannot visually recognize the positional relationship between the vehicle V1 and the vehicle V2 located behind the vehicle V1 because a part of the vehicle V2 is hidden by the vehicle body of the vehicle V1 from the viewpoint of the operator M. When the vehicle V1 and the operator M are located on the same floor, the operator M can approach a position at which the vehicle V1 and the vehicle V2 are close to each other and can thereby visually recognize the vehicles easily, but when the vehicle V1 and the operator M are located on different floors, the operator M cannot approach the vehicle V1 and therefore cannot visually recognize a position which the operator M desires to visually recognize. As illustrated in FIG. 5C, also when viewing the vehicles from a position of a smaller relative altitude than that in the case of a floor difference, such as a lower position at a lower part of the slope, the operator M cannot visually recognize the vehicle V2, which is believed to be present, because the vehicle V2 is hidden by the vehicle body of the vehicle V1 from the viewpoint of the operator M. In addition, as illustrated in FIG. 5D, also when the operator M present on the upper floor of the structure ST such as a building observes the vehicles V located on the lower side and thus having a lower relative altitude, there is a portion of the vehicle V1 that cannot be observed. As previously described, when the vehicle V1 and the operator M are located on the same floor, the operator M can approach the vehicle V1 to visually recognize the vehicle V1, but when the operator M is located on a floor with a different height of another type of structure ST, the operator M cannot approach the vehicle V1 and therefore cannot visually recognize a position which the operator M desires to visually recognize.

Thus, when the relative altitude between the first height position of the operator M and the second height position of the vehicle V is not less than a first predetermined value and the first height position of the operator M is lower (or higher) than the second height position of the vehicle V, a determination can be made that it is more difficult for the operator M to confirm the surroundings of the vehicle V than when the first height position is substantially equal to the second height position. Additionally or alternatively, when the relative altitude between the first height position of the operator M and the second height position of the vehicle V is not less than the first predetermined value, a determination can be made that the operator M cannot visually recognize a position which the operator M desires to visually recognize because the operator M cannot approach the vehicle V1. In the above-described cases, the first height position of the operator M is lower than the second height position of the vehicle V in the parking lot having a multi-level structure, but also in a case in which the first height position of the operator M is higher than the second height position of the vehicle V, when the relative altitude between the first height position of the operator M and the second height position of the vehicle V is not less than the first predetermined value, a determination can be made that the operator M cannot visually recognize a position which the operator M desires to visually recognize because the operator M cannot approach the vehicle V1. For example, as illustrated in FIG. 4C, a case can be considered in which the operator M is located on the second floor of a building and the vehicle V is present in a parking space in front of the first floor of the building. The above description is based on an example of the slope of the parking lot having a multi-level structure, but a determination can also be made on a slope of a general road in a similar manner.

In one or more embodiments of the present invention, when the difference between the first height position and the second height position is not less than the first predetermined value, a determination is made that it is difficult to confirm the surroundings or it is not possible to immediately approach the vehicle V, and the speed in the control instruction in the parking process for the vehicle V is changed to a lower value (speed). By limiting the range of the relative altitude between the operator M and the vehicle V, it is possible to appropriately extract a state (scene) in which it is difficult to confirm the surroundings of the vehicle. As a result, when it is difficult for the operator M to confirm the surroundings of the vehicle, the speed in the control instruction can be changed to a lower value thereby to allow the operator M to easily make an instruction.

When the difference between the first height position and the second height position is small, the easiness of confirming the surroundings of the vehicle is not much different. In one or more embodiments of the present invention, the first predetermined value is defined as the difference between the first height position and the second height position, with which it appears to be difficult for the operator M to confirm the surroundings of the vehicle. When the difference between the first height position and the second height position is not less than the first predetermined value, a determination is made that it is difficult for the operator M to confirm the surroundings of the vehicle.

The "first predetermined value" in one or more embodiments of the present invention can be appropriately determined in accordance with to the structure of a parking lot, the area in which the operator M can operate, or the like. For example, the first predetermined value can be set to 2 m. When the relative altitude is 2 m or more, the operator cannot easily approach the vehicle V and therefore cannot promptly visually recognize a position which the operator desires to visually recognize. The first predetermined value is a factor that is also affected by the height of the vehicle V, the height of the operator M, and the visual acuity of the operator M, but according to experiments, it has been found that the operator M tends to feel that "it is difficult to confirm the surroundings of the vehicle" and/or "it is difficult to operate the vehicle" when the first predetermined value is 2 m, that is, when the difference between the first height position and the second height exceeds 2 m. In the experiments, when operators M (testers) operated on a parking surface of a lower floor than the parking surface PG1 by a height of 2 m and on a slope (sidewalk) connected to the lower floor, all of the operators M who operated at positions with a height difference of more than 2 m answered that "it was difficult to confirm the surroundings of the vehicle" and "it was difficult to operate the vehicle." Also when the operators M (testers) operated on a parking surface higher than the parking surface PG1 by a height of 2 m, on a slope (sidewalk) connected to the upper floor, and on the structure ST, all of the operators M who operated at positions with a height difference of more than 2 m answered that "it was difficult to confirm the surroundings of the vehicle" and "it was difficult to operate the vehicle."

In the parking control method according to one or more embodiments of the present invention, when the first height position of the operator M is equal to or more than the second height position of the vehicle V by the first predetermined value, the first speed which is preliminarily set in the control instruction is changed to the second speed lower than the first speed. That is, the control device 10 is made to recalculate the control instruction in which the moving speed of the vehicle V is reduced because the situation in which the operator M observes the surroundings of the vehicle V from a position lower than the vehicle V can be determined as a situation that is difficult for the operator M to confirm. By reducing the speed in the control instruction, the margin time for the operation of moving the vehicle V is increased, and the moving operation can be facilitated. Through this operation, even when the operator M operates from a position having a relative altitude difference with respect to the vehicle V1, the operability for the operator M to remotely control the vehicle V can be ensured, and the easiness of confirming the situation around the vehicle can also be ensured.

When the distance between the operator M and the vehicle V is large, it may be difficult for the operator M to visually recognize the vehicle V. When the distance between the operator M and the vehicle V is not less than a predetermined distance, therefore, the control device 10 determines that the operator M is in a state of being difficult to confirm the vehicle V, and performs a process of changing the first speed to the second speed. Here, the distance between the operator M and the vehicle V refers to the shortest distance between the operator M and the vehicle V. For convenience, the horizontal distance between the operator M and the vehicle V may be used. By limiting the range of the distance between the operator M and the vehicle V, it is possible to appropriately extract a state in which it is difficult to confirm the surroundings of the vehicle. As a result, when the operator M is in a state of being difficult to confirm the surroundings of the vehicle, the speed in the control instruction can be changed to a lower value thereby to allow the operator M to easily operate the vehicle V.

In one or more embodiments of the present invention, the control device 10 takes into account an obstacle located around the vehicle. The control device 10 detects an obstacle present around the vehicle V. When an obstacle is detected between the operator M and the vehicle V, the control device 10 determines that a blind spot may occur due to the obstacle. When an obstacle is detected, a determination is made that the operator M is in a state of being difficult to confirm the vehicle V, and a process of changing the first speed to the second speed is performed. The case in which an obstacle is present between the operator M and the vehicle V can be extracted as a scene in which it is difficult to confirm the situation around the vehicle. As a result, when it is difficult for the operator M to confirm the situation around the vehicle, the speed in the control instruction can be changed to a lower value thereby to improve the operability of the vehicle V1 in the parking process.

The control procedure of parking control will be described below with reference to the flowchart illustrated in FIG. 6.

FIG. 6 is a flowchart illustrating the control procedure of the parking control process executed by the parking control system 1000 according to one or more embodiments of the present invention. The trigger for starting the parking control process is not particularly limited, and the parking control process may be triggered by the operation of a start switch of the parking control apparatus 100.

The parking control apparatus 100 according to one or more embodiments of the present invention has a function of moving the vehicle V in an autonomous manner to a parking space on the basis of the operation command acquired from outside of the vehicle.

In step 101, the control device 10 of the parking control apparatus 100 according to one or more embodiments of the present invention acquires information around the vehicle. Acquisition of the ranging signals and acquisition of the captured images may be selectively executed. The control device 10 acquires the ranging signals from the ranging devices 2 which are attached to multiple sites of the vehicle V. The control device 10 acquires the images which are captured by the cameras 1a to 1d attached to multiple sites of the vehicle V. Although not particularly limited, the camera 1a is disposed on the front grille part of the vehicle V, the camera 1d is disposed in the vicinity of the rear bumper, and the cameras 1b and 1e are disposed on the lower parts of the right and left door mirrors. A camera having a wide-angle lens with a wide view angle can be used as each of the cameras 1a to 1d. The cameras 1a to 1d capture images of boundary lines of parking spaces around the vehicle V and objects present around the parking spaces. The cameras 1a to 1d may be CCD cameras, infrared cameras, or other appropriate imaging devices.

In step 102, the control device 10 detects parking spaces into which parking is possible. The control device 10 detects frames (areas) of parking spaces on the basis of the images captured by the cameras 1a to 1d. The control device 10 detects empty parking spaces using the detection data from the ranging devices 2 and the detection data extracted from the captured images. The control device 10 detects available parking spaces from among the parking spaces. The available parking spaces are parking spaces which are empty (i.e., other vehicles are not parked) and to which routes for completing the parking can be calculated.

In one or more embodiments of the present invention, the condition that a parking route can be calculated means that a trajectory of the route from the current position to a target parking space can be rendered on the road surface coordinates without interfering with obstacles (including parked vehicles).

In step 103, the control device 10 transmits the available parking spaces to the operation terminal 5, controls the display 53 to display the available parking spaces, and requests the operator M to input selection information of the target parking space for parking the vehicle V. The target parking space may be automatically selected by the control device 10 or the parking facility side. When the operation command of specifying a parking space is input to the operation terminal 5, the parking space is set as the target parking space.

In one or more embodiments of the present invention, in step 104, the occupants are made to get off the vehicle. Thereafter, the vehicle V is moved to the target parking space by the remote control. The target parking space may be selected after the occupants get off the vehicle.

In step 105, the control device 10 acquires the relative altitude between the operator M and the vehicle V. The relative altitude is the difference between the first height position of the operator M and the second height position of the vehicle V. The control device 10 uses the previously described scheme to detect the position of the operator M. The position of the operator M includes the first height position in the height direction. In step 106, the control device 10 acquires the second height position of the vehicle V in the height direction. The control device 10 may obtain the difference between the first height position of the operator M and the second height position of the vehicle V (the second height position minus the first height position) and employ the difference as the relative altitude. The control device 10 may acquire as the relative altitude the first height position (height relative to the vehicle V) of the operator M, which is calculated on the basis of the detection results from the onboard ranging devices 2, or the first height position (height relative to the vehicle V) of the operator M, which is calculated on the basis of the images captured by the onboard cameras 1.

In step 106, the control device 10 uses the previously described scheme to detect a position at which an obstacle is present.

In step 107, the control device 10 calculates the parking route from a stop position of the vehicle V to the target parking space. The parking route includes a point of turn for parking necessary for moving to the parking space. For this operation, the parking route is defined as a line and is also defined as a strip-shaped area corresponding to the occupied area by the vehicle V based on the vehicle width. The occupied area by the vehicle V is defined with consideration for the vehicle width and a margin width ensured for movement.

In step 108, the control device 10 calculates the control instruction for the vehicle V to move along the parking route. Examples of the control instruction include operation instructions for one or more of the steering amount, steering speed, steering acceleration, shift position, speed, acceleration, and deceleration of the vehicle V. The control instruction includes the timing or position at which the above operation instruction for the vehicle V is executed. When the control instruction is executed, the vehicle V follows the parking route to move to the target parking space. The control device 10 according to one or more embodiments of the present invention is a so-called remote control-type parking control apparatus that executes the control instruction for moving the vehicle V along the calculated parking route on the basis of the operation command acquired from the operator M located outside the vehicle V.

The control device 10 according to one or more embodiments of the present invention sets the speed included in the control instruction in accordance with the relative altitude which is the difference between the first height position of the operator M and the second height position of the vehicle V. Specifically, when a determination is made that the difference between the first height position of the operator M and the second height position of the vehicle V is not less than the first predetermined value on the basis of the relative altitude, the control device 10 changes the first speed, which is preliminarily set in the control instruction, to the second speed lower than the first speed. That is, the control device 10 recalculates the control instruction in which the moving speed of the vehicle V is reduced because the situation in which the operator M looks up the vehicle V from a position lower than the vehicle V can be determined as a situation that is difficult for the operator M to confirm the position and movement of the vehicle V1. By reducing the speed in the control instruction, the speed at which the vehicle V moves along the parking route is reduced. This can improve the operability for the operator M to operate the vehicle in a situation in which it is difficult for the operator M to confirm the vehicle V.

The scheme of setting the second speed is not particularly limited. The second speed may be calculated by subtracting a predetermined value (positive value) from the first speed or may also be calculated by multiplying the first speed by a predetermined value ($0<K<1$). Additionally or alternatively, the relationship between a relative altitude HT of the first height position with respect to the second height position and a second speed MV may be preliminarily defined.

FIG. 7A is a diagram illustrating an example of the relationship between the relative altitude HT and the second speed MV. The position of the operator M becomes relatively lower as the relative altitude HT varies rightward along its axis (varies away from the point of origin). According to the relationship illustrated in the figure, when the relative altitude is a first threshold TH1 (<TH2) or more and less than a second threshold TH2, the vehicle speed is set to MV1, and when the vehicle speed is the second threshold TH2 or more and less than a third threshold TH3, the second speed MV is reduced as the relative altitude HT increases.

Although not particularly limited, the first threshold TH1 can be set, for example, to about 1 m. It is considered that the operator can confirm the movement of the vehicle V1 with no difficulty at a height difference of about 1 m on a slope or the like. The second threshold TH2 can be set, for example, to about 2 m. A scene with a large height difference can be extracted in a multi-level parking lot or the like, excluding a slope with a moderate height difference or the like. The third threshold TH3 can be set, for example, to about 4 m. In a multi-level parking lot, it is difficult for the operator M located on the first floor to operate the vehicle V1 located on the second floor or third floor mezzanine. When the relative altitude is not less than the third threshold TH3, the vehicle V1 is controlled to make a stop.

When the difference between the first height position and the second height position is not less than the third threshold TH3 (>TH2), the vehicle V1 is controlled to make a stop (speed=zero). Thus, the vehicle V1 is controlled to make a stop when the difference between the first height position and the second height position is not less than the third threshold TH3 (>TH2) higher than the second threshold TH2 at which the vehicle speed reduction control is started. The process of making a stop may be temporary. The operator M can operate the vehicle V1 with sufficient time.

When the difference between the first height position and the second height position is not less than the third threshold TH3 (>TH2), execution of the control instruction for parking the vehicle V1 is suspended or canceled. Thus, the execution of the control instruction for the vehicle V1 is suspended or canceled when the difference between the first height position and the second height position is not less than the third threshold TH3 (>TH2) higher than the second threshold TH2 at which the vehicle speed reduction control is started; therefore, the operator M can move to a position that allows the height difference to be reduced or can perform an input operation while considering the next instruction with a margin time.

The control device 10 according to one or more embodiments of the present invention sets a lower second speed as the distance between the operator M and the vehicle V increases. As the distance from the operator M increases, it becomes more difficult to perceive the movement of the vehicle V. The control device 10 controls the movement of the vehicle V to a lower speed as the distance from the operator M increases, so that the position of the vehicle V and the approach to an obstacle can be easily monitored. As a result, the operability for the operator M can be maintained or improved even when the vehicle V is present at a position distant from the operator M.

FIG. 7B is a diagram illustrating an example of the relationship between a distance D between the operator M and the vehicle V and a limiting ratio K for the speed MV. The distance D between the operator M and the vehicle V is a linear distance. The distance between the operator M and the vehicle V increases as the distance D varies rightward along its axis (varies away from the point of origin). The limiting ratio K is a coefficient (0<K<1) that is multiplied by the second speed applied when the relative distance is not lower than the first predetermined value (corresponds to the second threshold in FIG. 7A). The control device 10 according to one or more embodiments of the present invention sets the limiting ratio K to a smaller value (0<K<1) as the distance between the operator M and the vehicle V increases (as the operator M is more away from the vehicle V), and calculates a lower second speed multiplied by the limiting ratio K. As illustrated in the figure, when the distance between the operator M and the vehicle V is not more than a first distance threshold THd, the limiting ratio K is set to 1.0 and the second speed is not corrected, but when the distance between the operator M and the vehicle V exceeds the first distance threshold THd, the limiting ratio K is reduced in accordance with the distance D. As illustrated in the figure, a minimum value (e.g., 0.5) may be set for the limiting ratio K.

The limiting ratio K for the second speed is not limited to the above-described examples and may be associated with a parking environmental factor around the vehicle. Examples of the parking environmental factor in this process include conditions regarding the field of view, such as the presence or absence of an obstacle, the size of the obstacle, the size of a visually recognizable area, the size of a blind spot area, and the ratio of the size of the visually recognizable area and the size of the blind spot area, the detection environment such as weather (rainfall, snowfall) or brightness, and the road surface state. The vertical axis illustrated in FIG. 7A may be any of such parking environmental factors.

The condition regarding the field of view is obtained by calculating a range that can be visually recognized from the position of the operator M using the images captured by the cameras 1. In the condition regarding the field of view, the rightward direction on the horizontal axis is the direction in which the field of view becomes worse. The worse the field of view, the lower the limiting ratio K is set. For example, as the area of the blind spot area is larger, the limiting ratio K is a smaller value, and the second speed of the vehicle V is set to a lower value. The condition regarding the detection environment can be obtained on the basis of the on/off of a wiper function, the driving speed of the wiper function, the weather news acquired from outside, the captured images, the illuminometer values, and/or the calendar and time (determination whether before or after the sunset). In the condition regarding the detection environment, the rightward direction on the horizontal axis is the direction in which the detection accuracy deteriorates. For example, the worse the weather or the lower the brightness, the lower the limiting ratio K is set. For example, the limiting ratio K is set to a smaller value (0<K<1) as the driving speed of the wiper increases (the amount of rainfall increases) or the detected brightness becomes lower, and the second speed multiplied by the limiting ratio K is set to a lower value. The condition regarding the road surface state can be obtained on the basis of the slip ratio of a wheel and/or the weather. The road surface is slippery during rainfall, and the road surface state can therefore be estimated from the state of rainfall by obtaining the time of rainfall or the amount of rainfall on the basis of the on/off of the wiper function, the driving speed of the wiper function, the weather news obtained from outside, and/or the captured images. In the condition regarding the road surface state, the rightward direction on the horizontal axis is the direction in which the vehicle is in a more slippery state. For example, the limiting ratio K is set to a lower value (0<K<1) as a determination is made that the road surface is more slippery. For example, the limiting ratio K is set to a smaller value (0<K<1) as the slip ratio of a wheel increases, the driving speed of the wiper increases (the amount of rainfall increases), the snow fall state increases, or the detected brightness becomes lower, and the second speed of the vehicle V is set to a lower value. The slip ratio of a wheel is obtained from the ABS control unit.

Additionally or alternatively, the input operation can be restricted in accordance with the difference between the first height position and the second height position. The control device 10 according to one or more embodiments of the present invention causes the operation terminal 5 to prohibit reception of the operation command when the first height position is lower than the second height position and the difference between the first height position and the second height position is not less than the third threshold TH3 (>TH2). Thus, the input operation for the operation command to the operation terminal 5 is prohibited when the difference between the first height position and the second height position is not less than the third threshold TH3 (>TH2) higher than the second threshold TH2 at which the vehicle speed reduction control is started, and the operator M can therefore be informed that the input operation is not possible. By informing that the operation input cannot be performed, it is possible to guide the operator M to move to a position at which the height difference is small. In a situation in which the height difference is large, the accuracy of the operation performed by the operator M cannot be ensured. By not receiving the operation input, it is possible to prevent the vehicle V1 from moving on the basis of incorrect input information. Not receiving the operation input includes a process of ignoring the input information, a process of presenting information indicating that the operation input is not received, and a process of presenting information indicating that the parking control is not possible.

Additionally or alternatively, the operation input may not be received by causing the operation terminal 5 to prohibit presentation of information for receiving the operation command. Examples of the process of prohibiting the presentation of information for receiving the operation command include a process of not displaying an operation screen, a process of displaying the input switch in a grayed out manner, and a process of displaying a message in a superimposed manner on the operation screen. This allows the operator M not to perform a useless input operation that cannot be received. Moreover, when the operation screen is not presented, the operator M can thereby recognize that the parking control is inexecutable.

Figure 8A:
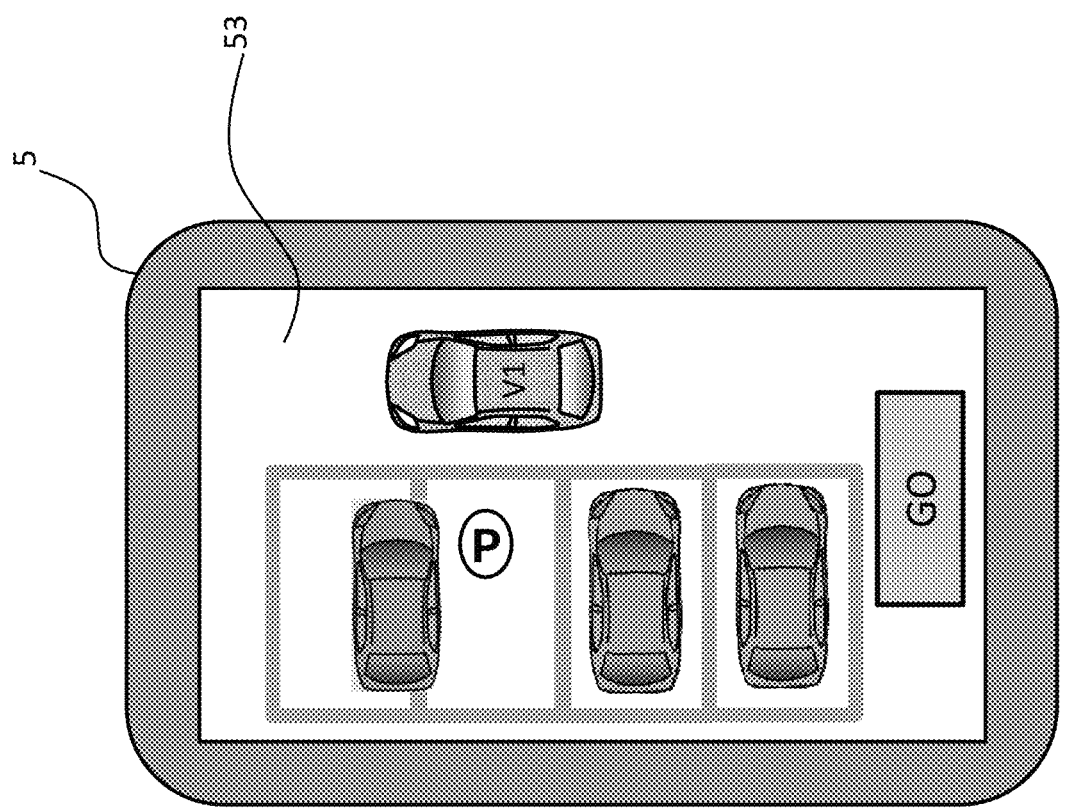
FIG. 8A is a diagram illustrating a first display example on an operation terminal in accordance with the relative altitude HT.
Figure 8B:
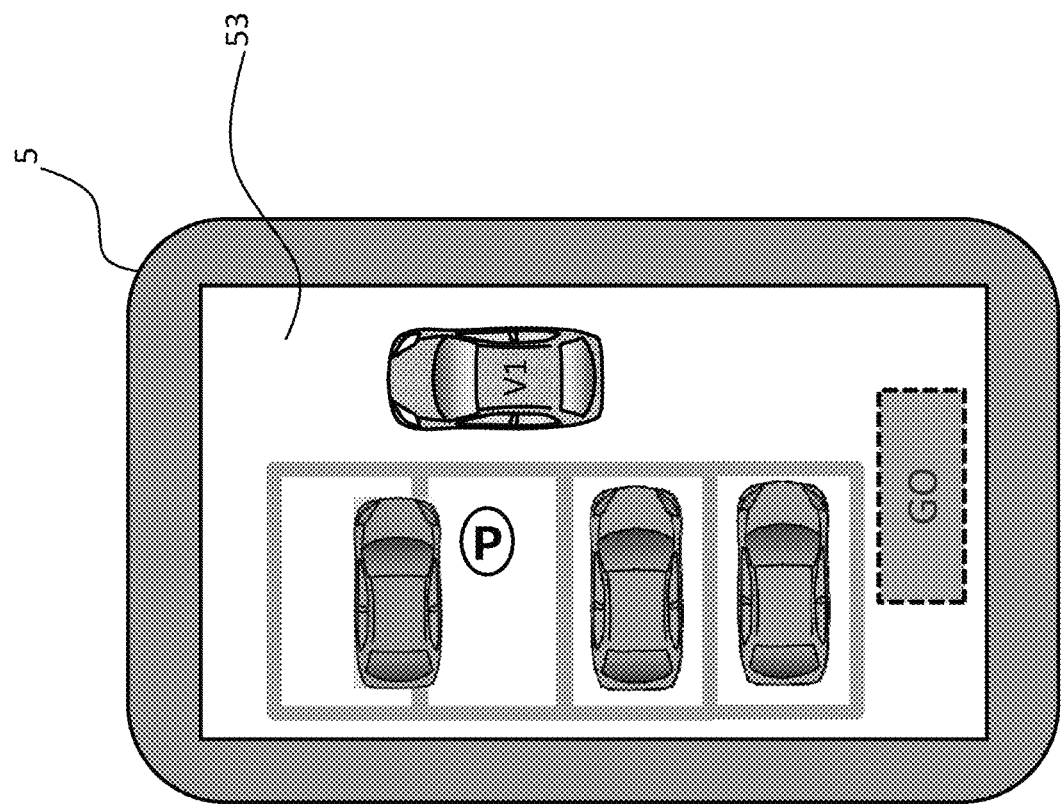
FIG. 8B is a diagram illustrating a second display example on an operation terminal in accordance with the relative altitude HT.
Figure 8C:
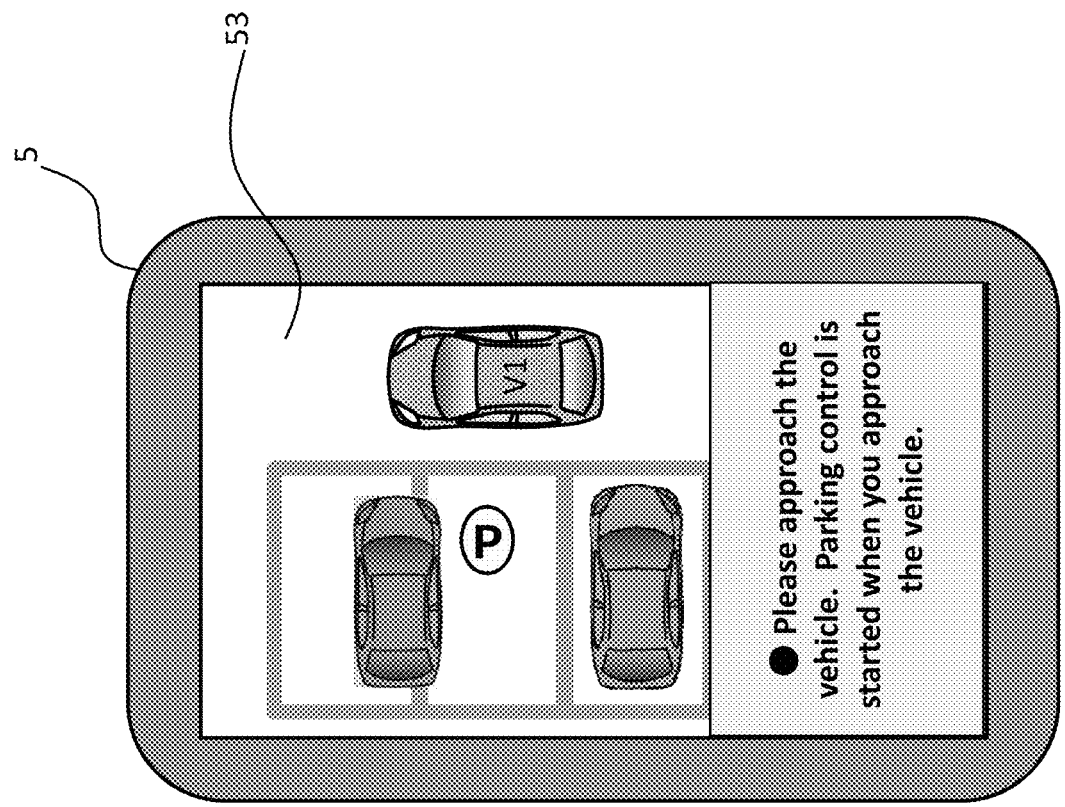
FIG. 8C is a diagram illustrating a third display example on an operation terminal in accordance with the relative altitude HT.

FIGS. 8A to 8C illustrate examples of the operation screen displayed on the display 53 of the operation terminal 5. FIG. 8A illustrates an example of the operation screen for receiving the operation command. This figure illustrates an example of the operation screen displayed when the difference between the first height position and the second height position is less than the third threshold (first predetermined value at which the deceleration control is started). In other words, this is an example of the operation screen displayed when the relative altitude is less than the first predetermined value and the operator M and the vehicle V are located at the same height. As illustrated in the figure, a "GO" button that serves as a deadman switch for instructing execution of the parking control is displayed. The deadman switch refers to a switch having a function of continuing execution of the parking control process only while the operator is applying force to the switch and a function of suspending or canceling the execution of the parking control process when the force applied to the switch is removed. While the deadman switch of the operation terminal 5 is being pressed, the parking control process is continuously executed.

FIG. 8B illustrates an example of the operation screen displayed when there is a relative altitude difference between the operator M and the vehicle V and the difference between the first height position and the second height position is not less than the third threshold (first predetermined value). As illustrated in the figure, the display of the "GO" button for instructing the execution of the parking control is grayed out. The grayed out "GO" button does not receive the input operation.

Likewise, FIG. 8C illustrates another example of the operation screen displayed when there is a relative altitude difference between the operator M and the vehicle V and the difference between the first height position and the second height position is not less than the third threshold (first predetermined value). As illustrated in the figure, a message is displayed in a superimposed manner on the "GO" button for instructing execution of the parking control. In this example, the "GO" button for instructing the execution of the parking control is hidden by the message "Please approach the vehicle. Parking control is started when you approach the vehicle." The "GO" button hidden by the display of the text does not receive the input operation performed by the operator M. When the difference between the first height position and the second height position is not less than the second threshold (first predetermined value) or the third threshold (first predetermined value), a vibration function of the operation terminal 5 may be activated to vibrate a vibration member of the operation terminal 5. By vibrating the operation terminal 5, it is possible to reduce the operability of the input operation performed by the operator M and notify the operator M that the input is not received.

FIG. 9 illustrates a subroutine of step 108. In step 120, the control device 10 determines whether or not the relative altitude between the first height position of the operator M and the second height position of the vehicle V is the first predetermined value or more. When the relative altitude is the first predetermined value or less, a situation can be determined in which the surroundings of the vehicle V can be easily confirmed. In this case, the process proceeds to step 125, in which the first speed preliminarily set as a specified value is applied to the control instruction without being changed.

On the other hand, when the value of the relative altitude between the first height position and the second height position is the first predetermined value or more, a determination is made that the operator M is in a situation in which it is difficult to confirm the surroundings of the vehicle V, and the process proceeds to step 121. In step 120, the control device 10 may evaluate the distance between the operator M and the vehicle V and set an additional condition that the distance between the operator M and the vehicle V is a predetermined distance or more. The speed can be changed with consideration for not only the relative altitude but also the state of separation between the horizontal positions. In step 120, the control device 10 may confirm the presence or absence of an obstacle between the operator M and the vehicle V and set an additional condition that an obstacle is present between the operator M and the vehicle V. The speed can be changed with consideration for not only the relative altitude but also the presence or absence of an obstacle.

In step 121, the control device 10 calculates the second speed in accordance with the relative altitude (altitude difference). The relative altitude as referred to herein is based on the assumption that the operator M is located at a lower position than the vehicle V. The second speed is calculated with reference to the correspondence relationship between the relative altitude HT and the second speed MV illustrated as an example in FIG. 7A.

In step 122, the control device 10 calculates the second speed using the limiting ratio K in accordance with the degree of the parking environmental factor. The second speed is calculated with reference to the correspondence relationship between the distance between the operator M and the vehicle V and the limiting ratio K illustrated as an example in FIG. 7B. The distance between the operator M and the vehicle V is one of parking environmental factors.

In step 123, the control device 10 causes the operation terminal 5 to prohibit input of the operation command. Step 123 is performed parallel to step 121, 122 or before or after step 121, 122. The control device 10 causes the operation terminal 5 to prohibit presentation of information for receiving the operation command or disables a switch function for receiving the operation command. This restricts the input of the operation command to the operation terminal 5.

In step 124, the control device 10 uses the calculated second speed for the parking control. The first speed initially set in the parking control is changed to the second speed. Additionally or alternatively, when the relative altitude is not less than the first predetermined value, the control device 10 may set the second speed to zero to stop the vehicle.

Referring again to FIG. 6, in step S108, the control device 10 generates the control instruction for moving the vehicle V along the calculated parking route. The control device 10 preliminarily stores the spec information of the vehicle V necessary for the control instruction. Examples of the control instruction include operation instructions for the targeted speed (including zero), deceleration, steering amount, steering speed, steering acceleration, and shift position of the vehicle V, which are associated with the timing or position when the vehicle V travels along the parking route, and other operation instructions. The targeted speed includes the upper limit speed. The targeted acceleration and deceleration include the upper limit acceleration and the upper limit deceleration. The targeted steering amount, steering speed, and steering acceleration include respective upper limit values. The instruction regarding the parking route and the operation instruction associated with the parking route are executed by the vehicle V, and the vehicle V can thereby be moved (parked) to the target parking space.

Figure 10:
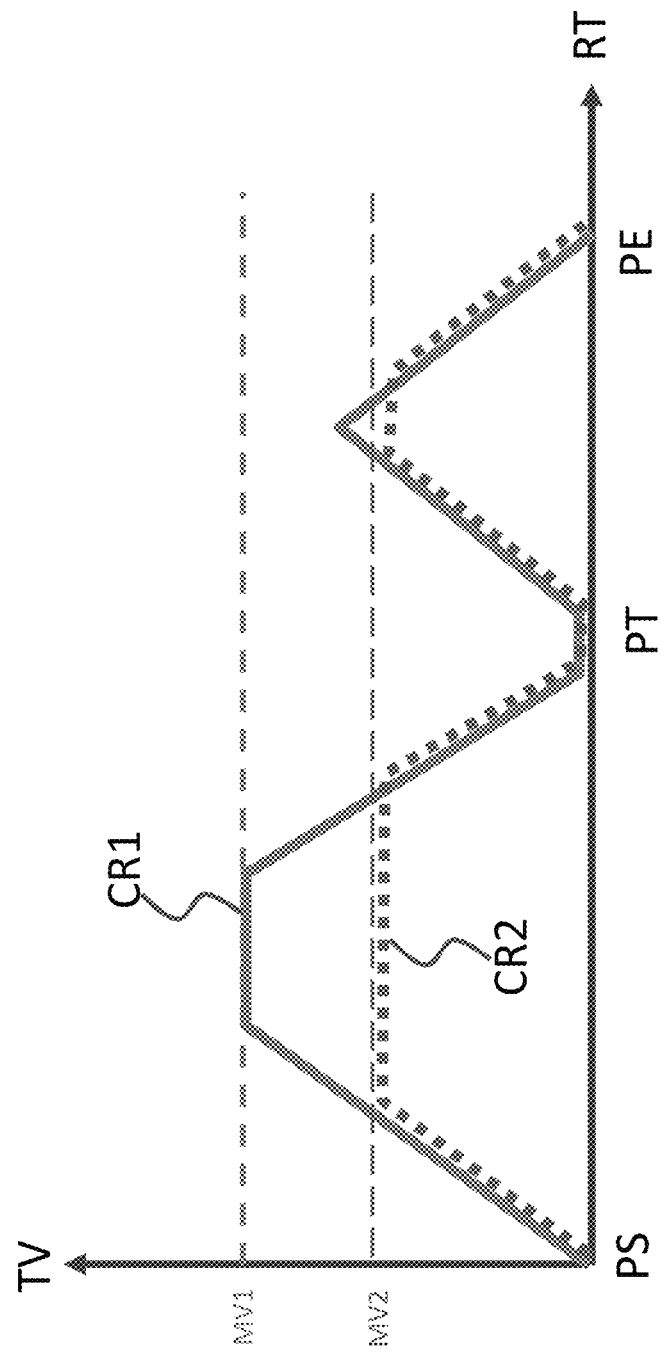
FIG. 10 is a diagram illustrating an example of a control instruction in which a target speed TV is defined at each point on a parking route RT.

FIG. 10 is a diagram illustrating an example of the control instruction. FIG. 10 illustrates an example of the control instruction in which a target speed TV is associated with a position RT on the parking route. The target speed TV when the vehicle V travels at each point on the parking route is defined. The target speed is zero at each of a start point PS of the parking control process, a point of turn for parking PT, and an end point PE of the parking control process on the parking route. In the control instruction illustrated in FIG. 6, solid line CR1 represents a control instruction to which a first upper limit speed MV1 (>a second upper limit speed MV2) of the preliminarily set first speeds is applied. Broken line CR2 represents a control instruction to which a second upper limit speed MV2 (<the first upper limit speed MV1) of the calculated second speeds is applied. The first upper limit speed and the second upper limit speed are each an aspect of the target speed. As illustrated in the figure, the target speed TV in the control instruction indicated by the broken line CR2 is lower than the target speed TV in the control instruction indicated by the solid line CR1. Here, the second upper limit speed is an upper speed that is applied when a determination is made that the relative altitude between the first height position of the operator M and the second height position of the vehicle V is not less the first predetermined value (|Second height position−First height position|>First predetermined value).

The process of step 109 and subsequent processes will be described. The parking control apparatus 100 according to one or more embodiments of the present invention executes a parking control process by remote control that includes transmitting a target parking space setting command, a parking control process start command, a parking suspension/cancellation command, and other necessary commands from outside to the vehicle V1 to perform the parking without getting on the vehicle V. In step 109, the control device 10 controls the display 53 of the operation terminal 5 to present the parking route. When the operator M confirms the parking route and the execution instruction is input in step 110, the process proceeds to step 111. The operation terminal 5 transmits the execution instruction from the operator M to the parking control apparatus 100 of the vehicle V. The parking control apparatus 100 of the vehicle V starts the parking control.

In step 113, the control device 10 periodically calculates the relative altitude (the difference between the first height position and the second height position). The relative altitude changes due to the movement of the vehicle V or the movement of the operator M, and the easiness for the operator M to confirm the vehicle V changes accordingly. The control device 10 calculates the relative altitude at a predetermined cycle in order to respond to a change in the situation. In step 114, the control device 10 determines whether or not there is a change in the relative altitude. When there is a change in the relative altitude, the control instruction is calculated again because there are also changes in the easiness for the operator M to confirm the vehicle V and the parking route and the easiness of the remote operation. When a new appropriate control instruction can be calculated, a new parking route is employed. In step 115, the control device 10 updates the control instruction calculated in step 108. When there is no change in the relative altitude in step 114, it is not necessary to calculate a new control instruction, so the process proceeds to step 116.

In step 116, the control device 10 monitors the change in the relative altitude until the vehicle V reaches the point of turn for parking. When the vehicle V reaches the point of turn for parking, the gear shift included in the control instruction is executed in step 117. Step 117 is followed by step 118, in which the parking control is completed by sequentially executing control instructions.

The parking control apparatus 100 according to one or more embodiments of the present invention controls the operation of the drive system 40 via the vehicle controller 70 in accordance with the control instruction so that the vehicle V moves along the parking route. The parking control apparatus 100 calculates command signals to the drive system 40 of the vehicle V, such as an EPS motor, while feeding back the output value of the steering angle sensor 50 of the steering apparatus so that the travel trajectory of the vehicle V coincides with the calculated parking route, and transmits the command signals to the drive system 40 or to the vehicle controller 70 which controls the drive system 40.

The parking control apparatus 100 according to one or more embodiments of the present invention includes a control unit for parking control. The control unit for parking control acquires shift range information from an AT/CVT control unit, wheel speed information from an ABS control unit, steering angle information from a steering angle control unit, engine speed information from an ECM, and other necessary information. On the basis of these information items, the control unit for parking control calculates and outputs instruction information on the autonomous steering to the EPS control unit, instruction information such as warning to a meter control unit, etc. The control device 10 acquires information items, which are acquired by the steering angle sensor 50 of the steering apparatus of the vehicle V, the vehicle speed sensor 60, and other sensors of the vehicle V, via the vehicle controller 70.

The drive system 40 according to one or more embodiments of the present invention drives the vehicle V to move (travel) from the current position to the target parking space by driving based on the control command signals acquired from the parking control apparatus 100. The steering apparatus according to one or more embodiments of the present invention is a drive mechanism that moves the vehicle V in the right and left directions. The EPS motor included in the drive system 40 drives the power steering mechanism of the steering of the steering apparatus on the basis of the control command signals acquired from the parking control apparatus 100 to control the steering amount and controls the operation when moving the vehicle V to the target parking space. The control content and operation scheme for parking of the vehicle V are not particularly limited, and any scheme known at the time of filing the present application can be appropriately applied.

When the parking control apparatus 100 according to one or more embodiments of the present invention controls the vehicle V to move to the target parking space along the route calculated on the basis of the position of the vehicle V and the position of the target parking space, the accelerator and the brake are controlled in an autonomous manner on the basis of the designated control vehicle speed (set vehicle speed), and the operation of the steering apparatus controls the movement of the vehicle V in an autonomous manner in accordance with the vehicle speed.

The parking control method according to one or more embodiments of the present invention is used in the parking control apparatus as the above and therefore exhibits the following effects. The parking control apparatus 100 according to one or more embodiments of the present invention is configured and operates as the above and therefore exhibits the following effects.

(1) In the parking control method according to one or more embodiments of the present invention, when the relative altitude between the first height position of the operator M and the second height position of the vehicle V is not less than the first predetermined value, the first speed which is preliminarily set in the control instruction is changed to the second speed lower than the first speed. That is, the control device 10 is made to recalculate the control instruction in which the moving speed of the vehicle V is reduced because the situation in which the operator M observes the surroundings of the vehicle V from a position having a relative altitude difference with respect to the vehicle V can be determined as a situation that is difficult for the operator M to confirm. By reducing the speed in the control instruction, the moving operation of the vehicle V can be facilitated. Through this operation, even when the operator M operates from a position having a relative altitude difference with respect to the vehicle V1, the operator M can confirm the movement of the vehicle V and it is possible to ensure the operability during the remote control and the easiness of confirming the situation around the vehicle. By reducing the speed of the vehicle, the operator can quickly and easily approach the vehicle, and the situation confirmation can be easily performed around the vehicle.

(2) In the parking control method according to one or more embodiments of the present invention, when the difference between the first height position and the second height position is not less than the first predetermined value, the vehicle V1 is controlled to make a stop, and the operator M can therefore operate the vehicle V1 with sufficient time.

(3) In the parking control method according to one or more embodiments of the present invention, when the difference between the first height position and the second height position is not less than the first predetermined value, execution of the control instruction for parking the vehicle V1 is suspended or canceled. Thus, the execution of the control instruction for the vehicle V1 is suspended or canceled when the difference between the first height position and the second height position is not less than the first predetermined value at which the vehicle speed reduction control is started, and the operator M can therefore perform the input operation with a margin.

(4) In the parking control method according to one or more embodiments of the present invention, when the difference between the first height position and the second height position is not less than the first predetermined value, the operation terminal 5 is made to prohibit reception of the operation command. Thus, the input operation for the operation command to the operation terminal 5 is prohibited when the difference between the first height position and the second height position is not less than the first predetermined value, and the operator M can therefore be informed that the operation is not possible. By informing that the operation input cannot be performed, it is possible to guide the operator M to move to a position at which the height difference is small (a position on the upper side). In a situation in which the height difference is large, the accuracy of the operation performed by the operator M cannot be ensured. By not receiving the operation input, it is possible to prevent the vehicle V1 from moving on the basis of incorrect input information.

(5) In the parking control method according to one or more embodiments of the present invention, the operation input is not received by causing the operation terminal 5 to prohibit presentation of information for receiving the operation command. By not displaying an operation screen, the operator M can be prevented from performing a useless input operation that cannot be received. Moreover, when the operation screen is not presented, the operator M can thereby recognize that the parking control is inexecutable.

(6) When the distance between the operator M and the vehicle V is large, it may be difficult for the operator M to visually recognize the vehicle V. In the parking control method according to one or more embodiments of the present invention, when the distance between the operator M and the vehicle V is not less than a predetermined distance, a determination is made that the operator M is in a state of being difficult to confirm the vehicle V, and a process of changing the first speed to the second speed is performed. When the operator M is separated from the vehicle V, it is possible to extract a state in which it is difficult to confirm the surroundings of the vehicle. As a result, when it is difficult for the operator M to confirm the surroundings of the vehicle, the speed in the control instruction can be changed to a lower value thereby to allow the operator M to easily operate.

(7) In the parking control method according to one or more embodiments of the present invention, an obstacle present around the vehicle V is detected, and when an obstacle is detected between the operator M and the vehicle V, a process of changing the first speed included in the control instruction to the second speed is performed. The speed can be reduced by extracting a scene in which an obstacle is present between the operator M and the vehicle V and it is difficult to confirm the surroundings of the vehicle. As a result, even when the operator M is present at a relatively lower position and it is difficult to confirm the movement of the vehicle, the operator M can confirm the movement of the vehicle V and it is possible to ensure the operability during the remote control and the easiness of confirming the situation around the vehicle.

(8) Also in the parking control apparatus 100 in which the parking control method according to one or more embodiments of the present invention is executed, the actions and effects as described in the above (1) to (7) are exhibited.

Embodiments heretofore explained are described to facilitate understanding of the present invention and are not described to limit the present invention. It is therefore intended that the elements disclosed in the above embodiments include all design changes and equivalents to fall within the technical scope of the present invention.

DESCRIPTION OF REFERENCE NUMERALS

1000 Parking control system
100 Parking control apparatus
10 Control device
11 CPU
12 ROM
13 RAM
132 Storage device
133 Map information
134 Parking lot information
135 Obstacle information
20 Input device
21 Communication device
30 Output device
31 Display
1a-1d Cameras
2 Ranging devices
3 Information server
31 Communication device
32 Storage device
33 Map information
34 Parking lot information
35 Obstacle information
5 Operation terminal
51 Communication device
52 Input device
53 Display
200 Onboard device
40 Drive system
50 Steering angle sensor
60 Vehicle speed sensor
70 Vehicle controller
V, V1 Vehicle

The invention claimed is:

1. A parking control method of executing a control instruction for moving a vehicle along a parking route, the parking route being calculated based on an operation command acquired from an operator located outside the vehicle, the parking control method comprising:

detecting a horizontal distance between the operator and the vehicle;
detecting a relative altitude between a first height position of the operator and a second height position of the vehicle, wherein the first and second height positions are at different altitudes;
when the relative altitude between the operator and the vehicle is a first threshold or more and less than a second threshold and the horizontal distance between the operator and the vehicle is less than a first predetermined distance, moving the vehicle along the parking route at a first speed set in the control instruction;
when:
the relative altitude between the operator and the vehicle is the first threshold or more and less than the second threshold and the horizontal distance between the operator and the vehicle is less than a second predetermined distance and more than the first predetermined distance, moving the vehicle along the parking route at a second speed lower than the first speed and higher than zero; or
the relative altitude is the second threshold or more and less than a third threshold higher than the second threshold, moving the vehicle along the parking route at the second speed lower than the first speed and higher than zero; and
when the relative altitude is the third threshold or more, suspending or canceling execution of the control instruction.

2. The parking control method according to claim 1, wherein the second speed is set lower as the relative altitude increases.

3. The parking control method according to claim 1, comprising,
when the relative altitude is more than the third threshold, causing an operation terminal operated by the operator to prohibit reception of the operation command instructing execution of the control instruction.

4. The parking control method according to claim 1, comprising, when the relative altitude is more than the third threshold, causing an operation terminal operated by the operator to prohibit presentation of information for receiving the operation command instructing execution of the control instruction.

5. The parking control method according to claim 1, comprising,
when a horizontal distance between the operator and the vehicle is not less than a first predetermined distance, changing the first speed to the second speed.

6. The parking control method according to claim 1, comprising:
detecting an obstacle present around the vehicle; and
when detecting the obstacle between the operator and the vehicle, changing the first speed to the second speed.

7. A parking control apparatus comprising a control device configured to execute a control instruction for moving a vehicle along a parking route, the parking route being calculated based on an operation command acquired from an operator located outside the vehicle, the control device operating to:
detect a horizontal distance between the operator and the vehicle;
detect a relative altitude between a first height position of the operator and a second height position of the vehicle, wherein the first and second height positions are at different altitudes;

when the relative altitude between the operator and the vehicle is a first threshold or more and less than a second threshold and the horizontal distance between the operator and the vehicle is less than a first predetermined distance, move the vehicle along the parking route at a first speed set in the control instruction;

when:
- the relative altitude between the operator and the vehicle is the first threshold or more and less than the second threshold and the horizontal distance between the operator and the vehicle is less than a second predetermined distance and more than the first predetermined distance, moving the vehicle along the parking route at a second speed lower than the first speed and higher than zero; or
- the relative altitude is the second threshold or more and less than a third threshold higher than the second threshold, move the vehicle along the parking route at the second speed lower than the first speed and higher than zero; and when the relative altitude is the third threshold or more, suspend or cancel execution of the control instruction.

\* \* \* \* \*